United States Patent
Lloyd et al.

(10) Patent No.: US 6,653,377 B1
(45) Date of Patent: Nov. 25, 2003

(54) SYSTEM FOR THE CONTAINED TRANSFER OF PARTICULATES

(75) Inventors: Steven M. Lloyd, Smyrna, DE (US); Craig R. Scheir, Dover, DE (US); Lewis R. Dickerson, Magnolia, DE (US); Donald R. Cohee, Felton, DE (US); David S. Burnham, Dover, DE (US); Tony R. McKee, Dover, DE (US); Charles R. Sandy, Camden, DE (US); John K. Folke, Harrington, DE (US)

(73) Assignee: ILC Dover, Inc., Frederica, DE (US)

( * ) Notice: Subject to any disclaimer, the term of this patent is extended or adjusted under 35 U.S.C. 154(b) by 0 days.

(21) Appl. No.: 09/500,460

(22) Filed: Feb. 9, 2000

Related U.S. Application Data

(60) Provisional application No. 60/119,455, filed on Feb. 10, 1999.

(51) Int. Cl.$^7$ ............................................. C08K 5/20
(52) U.S. Cl. ..................... 524/221; 524/243; 524/448
(58) Field of Search ................................ 524/221, 243, 524/448

(56) References Cited

U.S. PATENT DOCUMENTS

| | | | |
|---|---|---|---|
| 2,584,202 A | 2/1952 | Harp, Sr. | |
| 2,875,562 A | 3/1959 | Mitchell | |
| 4,785,042 A | * 11/1988 | Azuma et al. | ............... 524/210 |
| 4,953,752 A | 9/1990 | Tousignant et al. | |
| 4,991,633 A | 2/1991 | Wong | |
| 5,100,930 A | * 3/1992 | Fukui et al. | ................. 523/100 |
| 5,120,586 A | 6/1992 | Nedzu et al. | |
| 5,414,887 A | 5/1995 | Abel et al. | |
| 5,484,004 A | 1/1996 | Bolz | |
| 5,609,930 A | 3/1997 | Matsunaga et al. | |
| 5,715,645 A | 2/1998 | Fukuda | |
| 5,735,321 A | 4/1998 | Martyn et al. | |
| 5,771,667 A | 6/1998 | McGregor et al. | |
| 5,775,544 A | 7/1998 | Semenenko | |
| 5,791,123 A | 8/1998 | Bolz | |
| 5,836,136 A | 11/1998 | Highberger | |
| 5,846,620 A | 12/1998 | Compton | |
| 5,944,070 A | 8/1999 | Schmidt et al. | |
| 6,210,764 B1 | * 4/2001 | Hayes | ........................ 428/34.9 |

OTHER PUBLICATIONS

Upjohn Chemical Division Technical Brochure.
Chemical Processing article entitled "Continous bagging eliminates dust, powder handling", Brayton O. Paul.
Custom Packaging Systems, Inc. "Rhino Tough" Bulletin.
Lormac Industrial Distributors—Products, Bulletin (pp. 1–3).
Technaseal Brochure entitled "The Vertrod Guide to Thermal Impulse heat Sealing Machinery".

\* cited by examiner

*Primary Examiner*—Peter D. Mulcahy
(74) *Attorney, Agent, or Firm*—Stevens, Davis, Miller & Mosher, L.L.P.

(57) ABSTRACT

An economical and reliable system for the contained transfer of particulates by means of a series of transfer containers facilitates the particulate transfer without either exposure of the operating personnel and the environment to the particulate, or environmental contamination of the particulate itself. The system employs a multiple o-ring canister assembly which can be attached to either the discharging port or charging port of a piece of processing equipment. The canister has a series of circumferential o-ring grooves which allows the attachment of a series of individual transfer containers. In a charging mode, once the particulate is charged to the processing equipment, a first transfer container is collapsed and a second transfer container is placed in the next o-ring groove, thereby containing the remaining contaminated section of the first transfer container. The first transfer container is removed through a bag-out sleeve which is an integral part of the second transfer container. The process is repeated in a stepwise fashion by moving to the next groove in the canister until the process equipment is completely charged in a particulate contained manner.

5 Claims, 39 Drawing Sheets

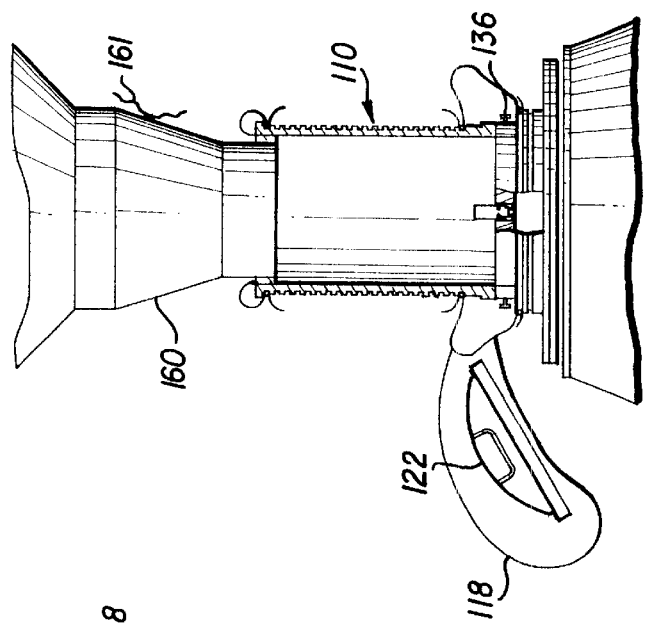
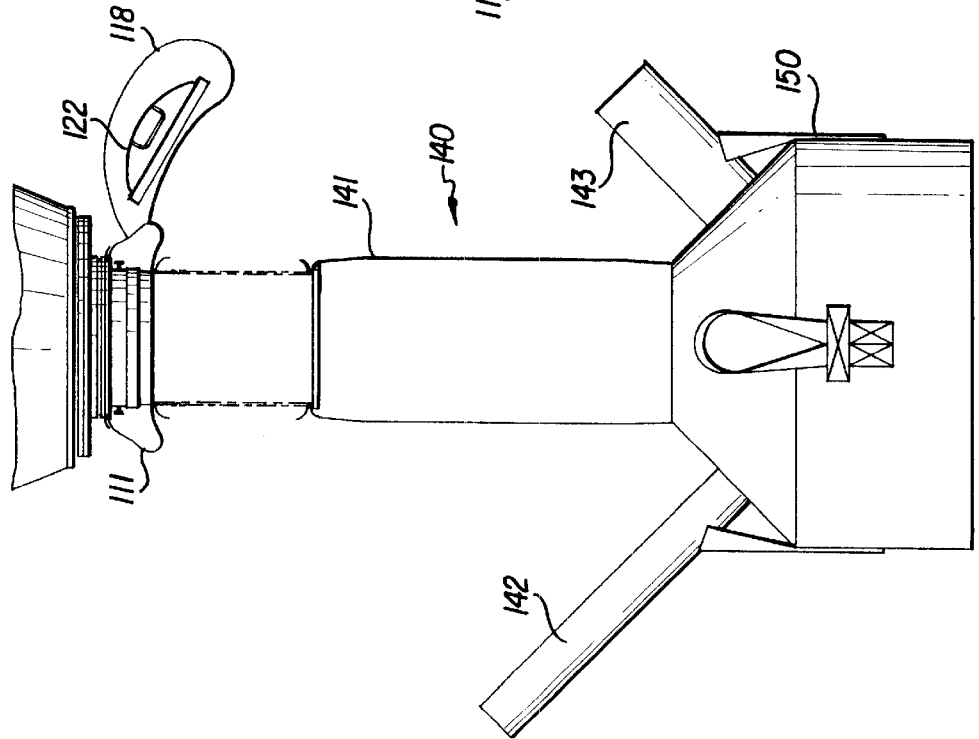

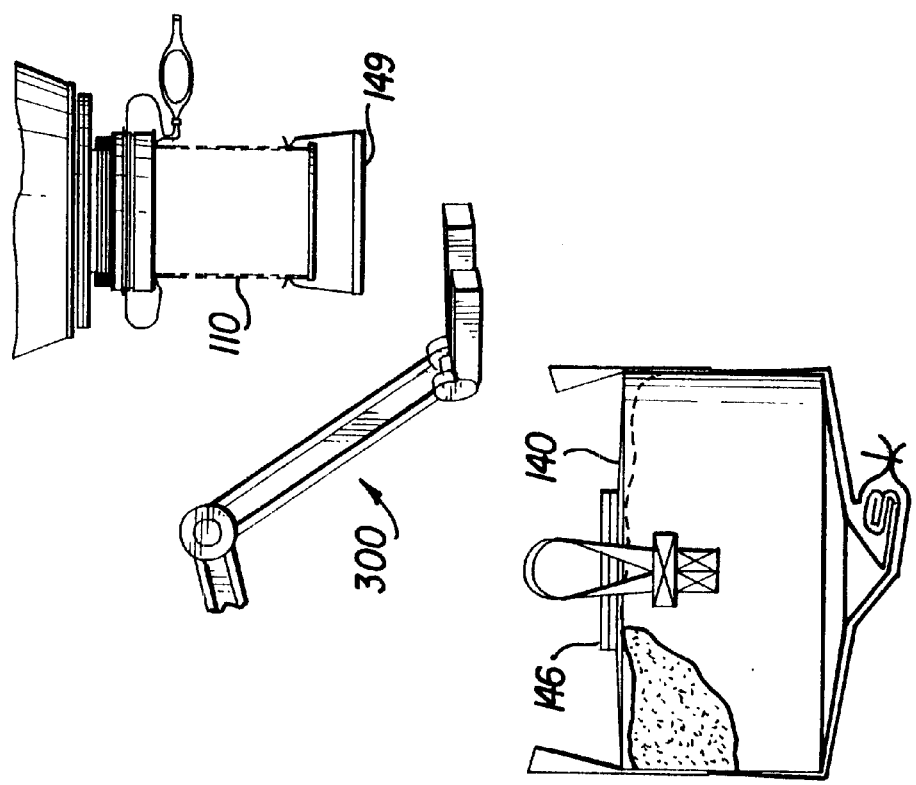

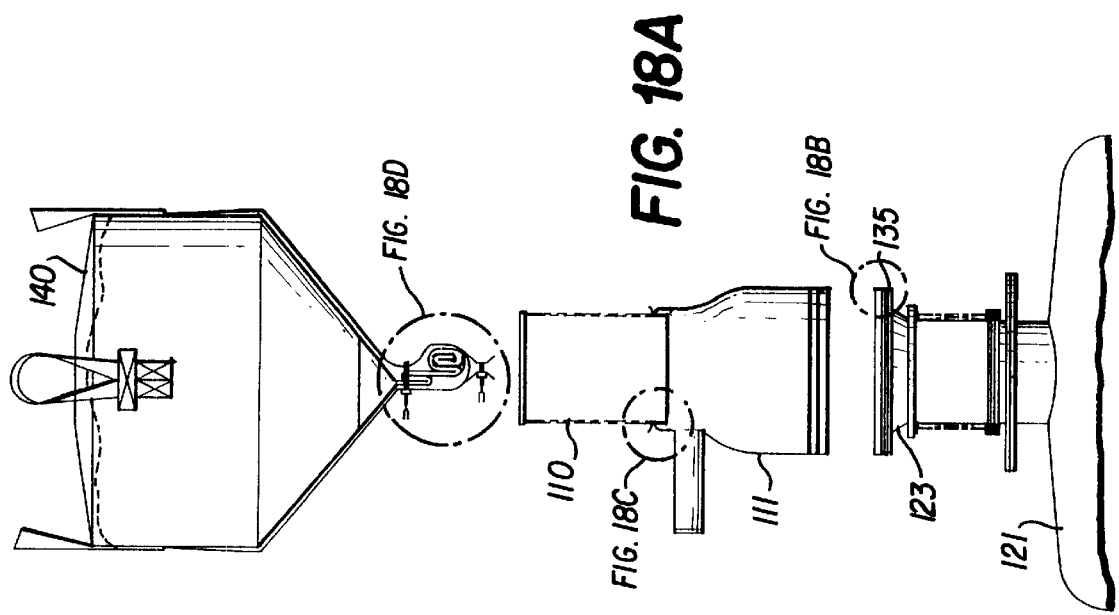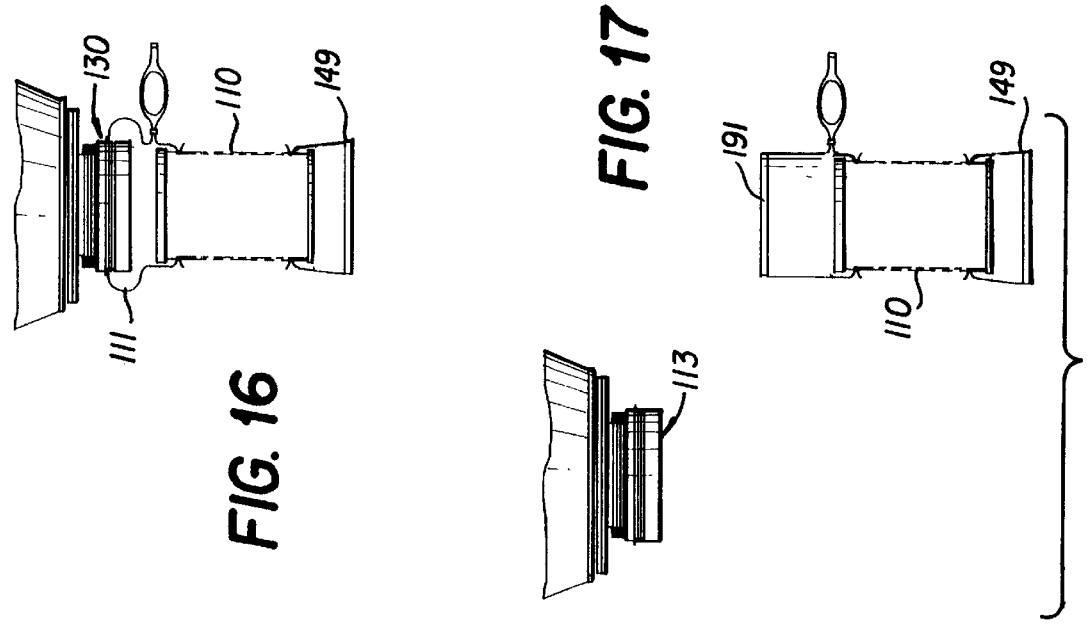

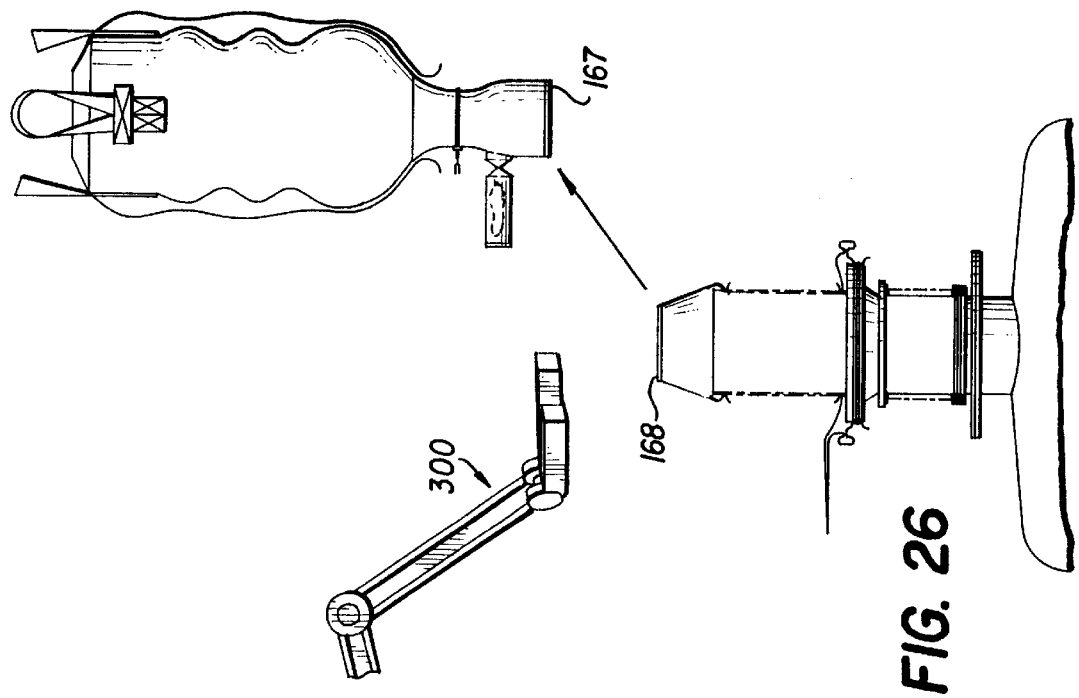
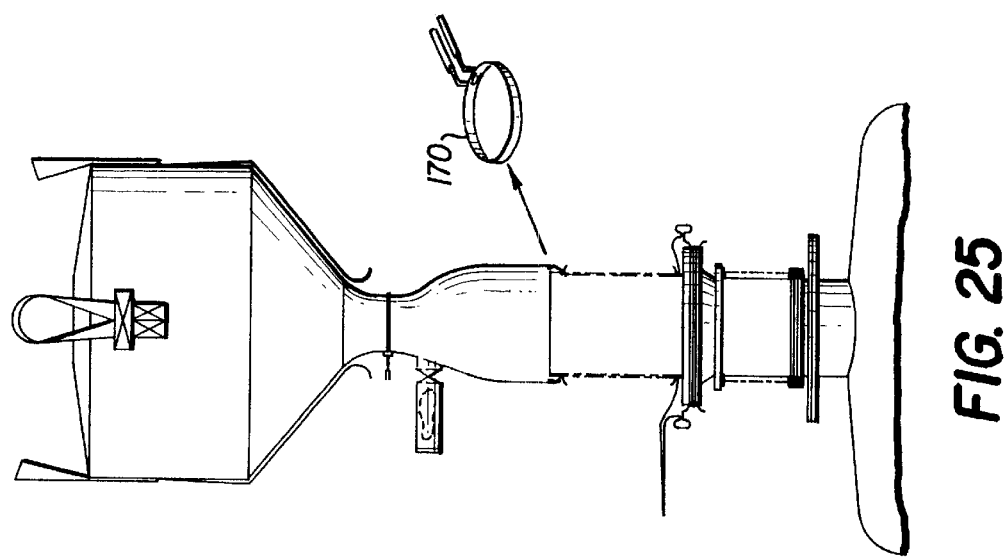

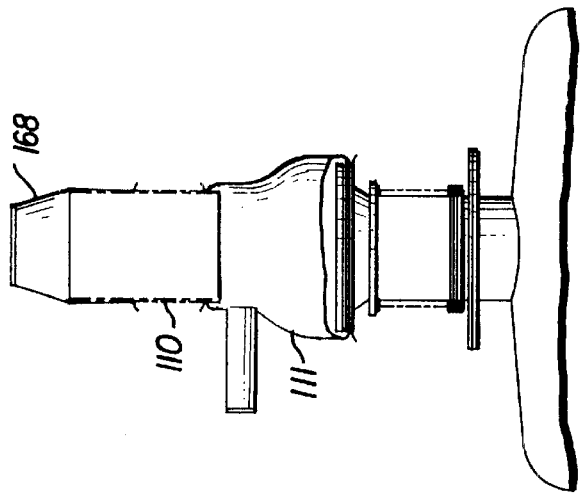
FIG. 32
RETURN TO STEP 5 AND REPEAT PROCESS
FOR REMAINING PRODUCT INGREDIENTS
FIG. 31
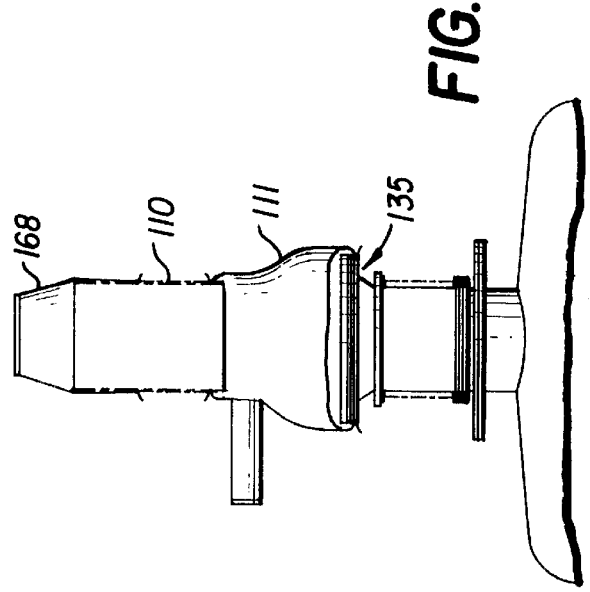
FIG. 33

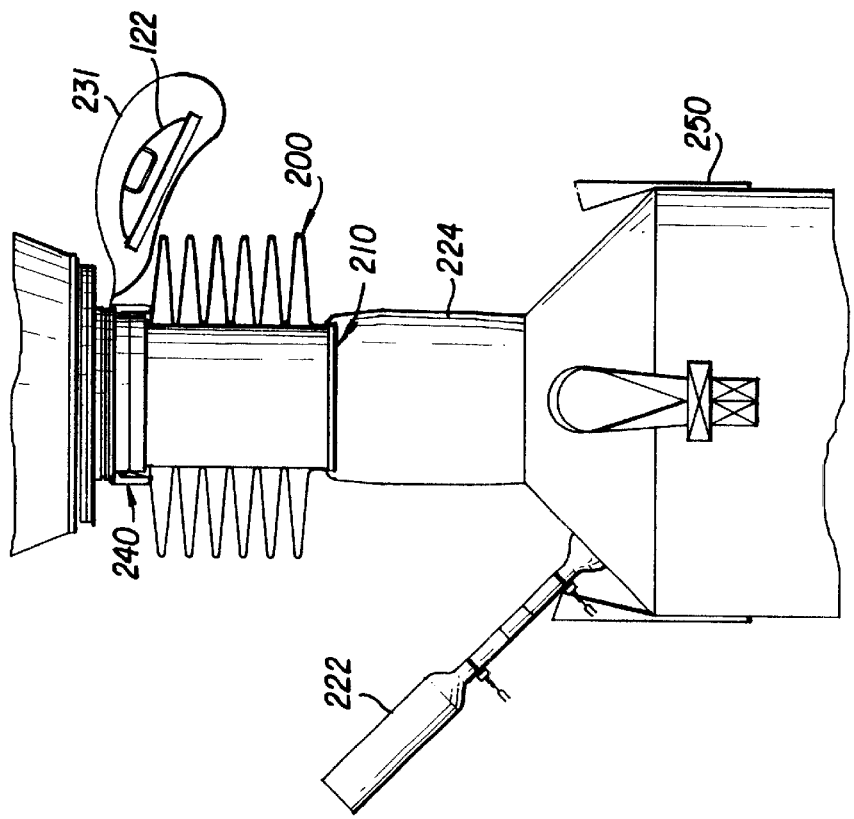
FIG. 38
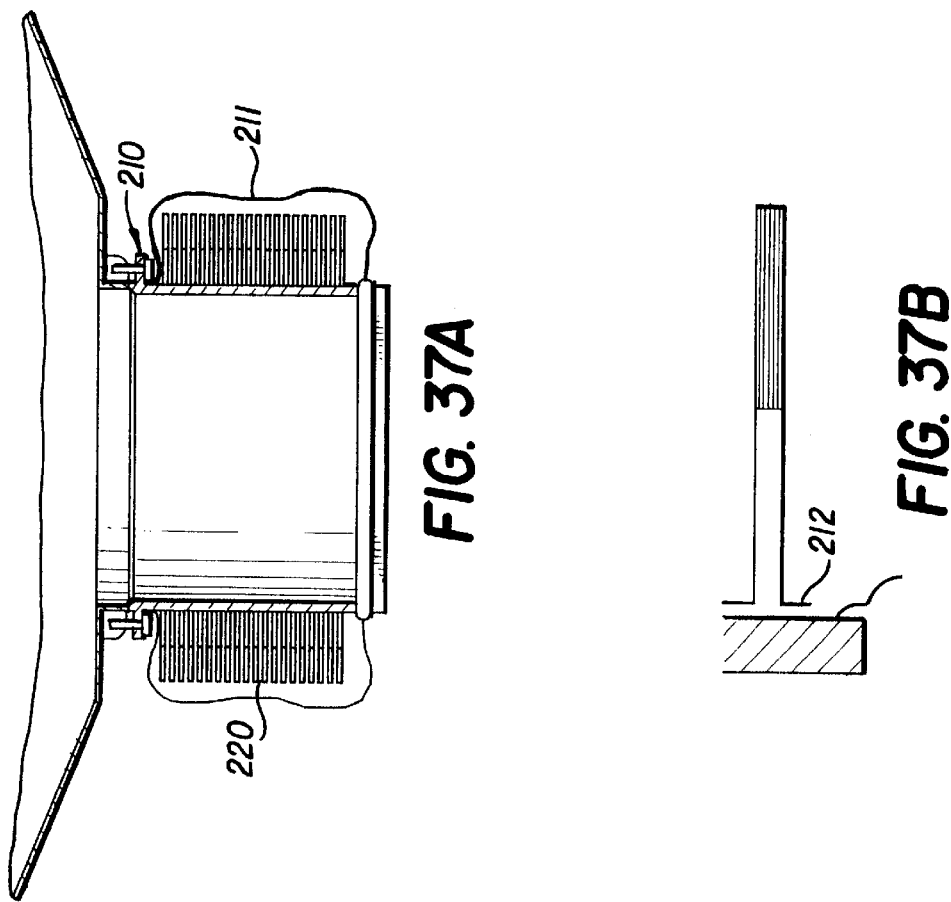
FIG. 37A
FIG. 37B

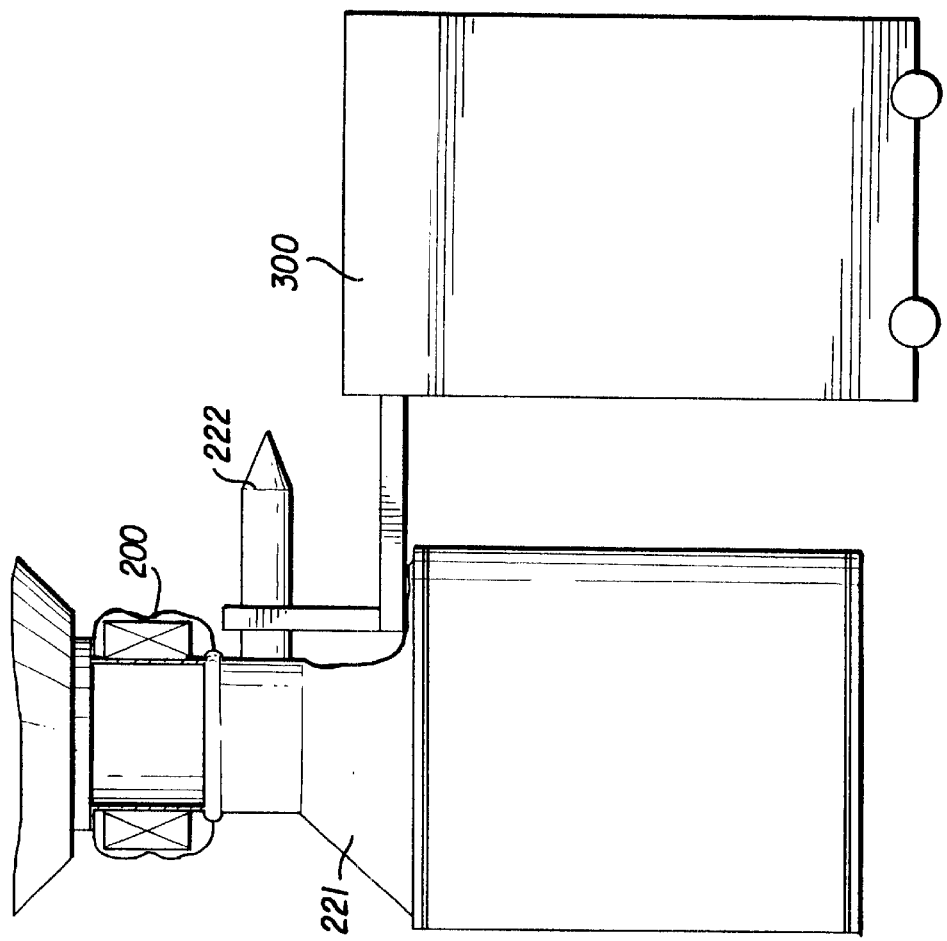
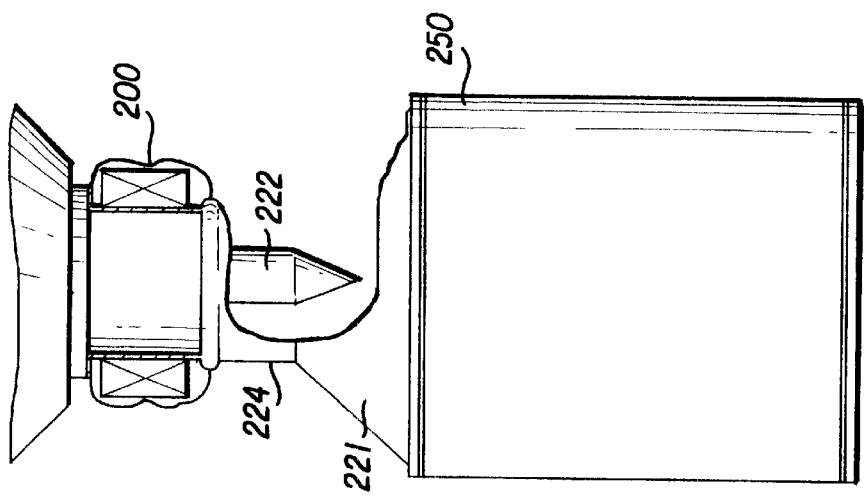

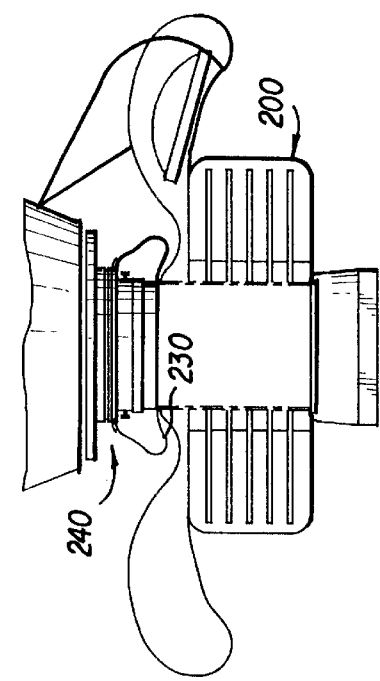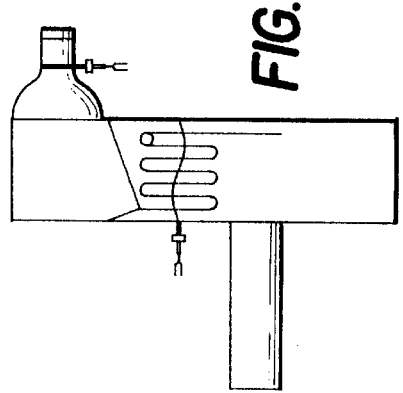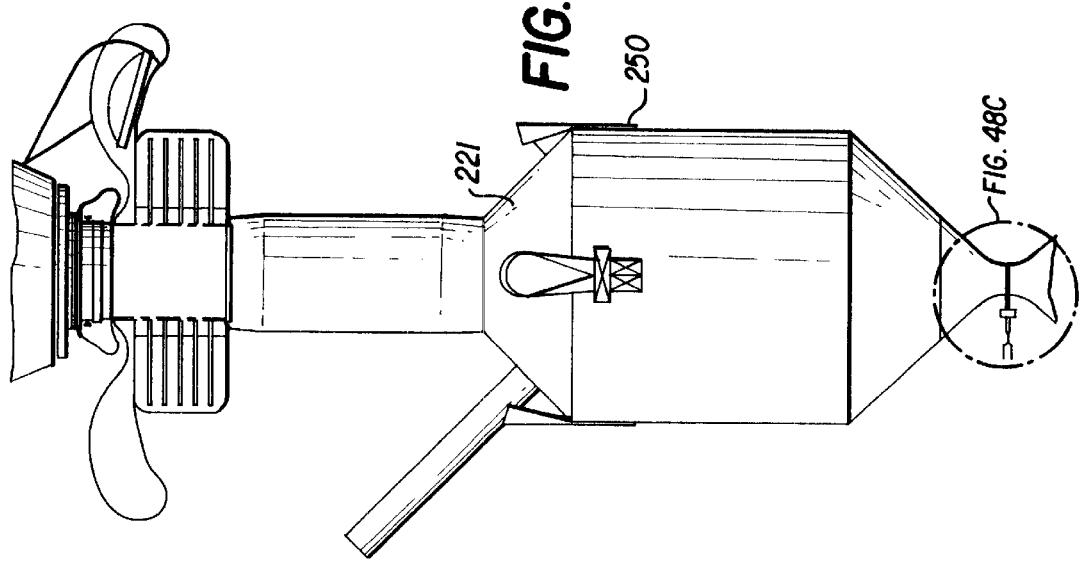

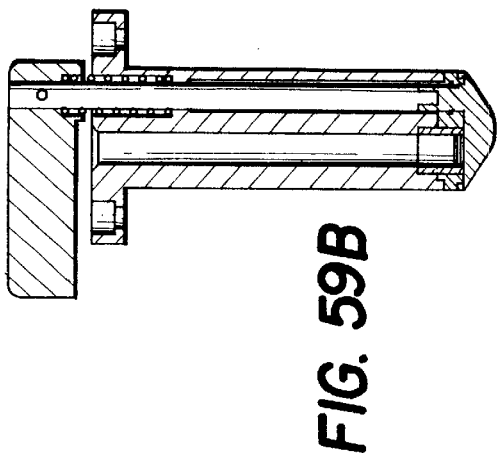
FIG. 59B
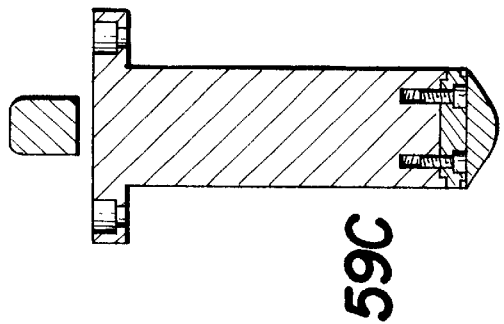
FIG. 59C
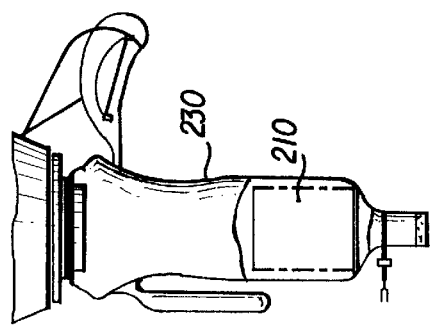
FIG. 51B
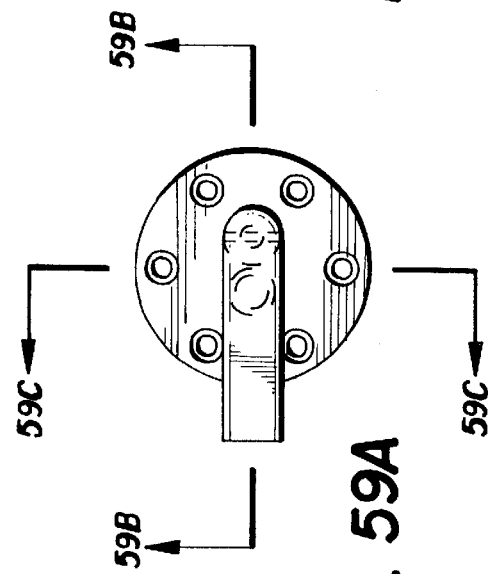
FIG. 59A
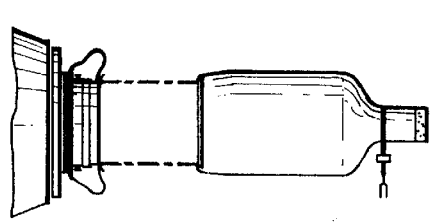
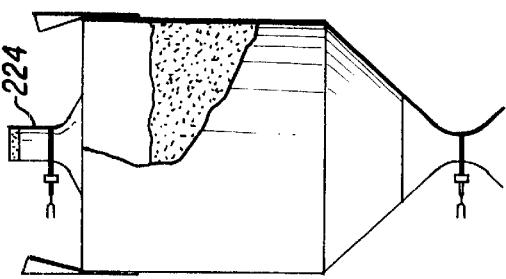
FIG. 51A

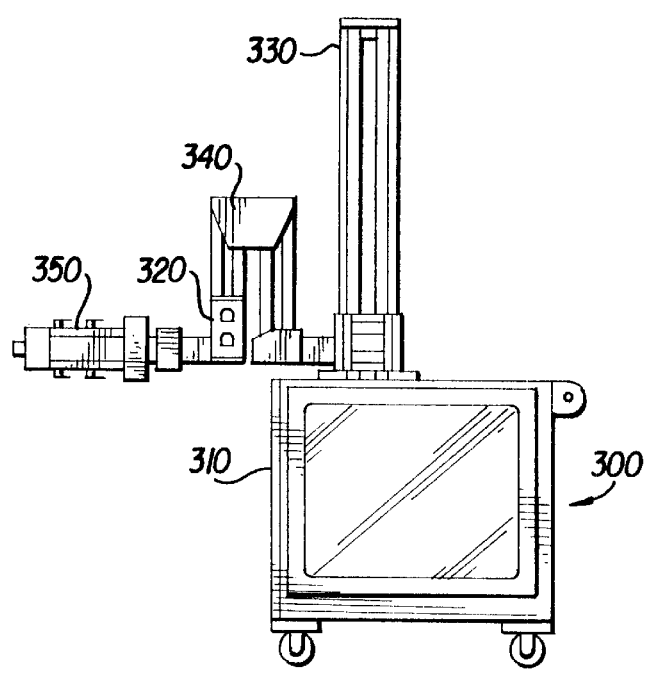
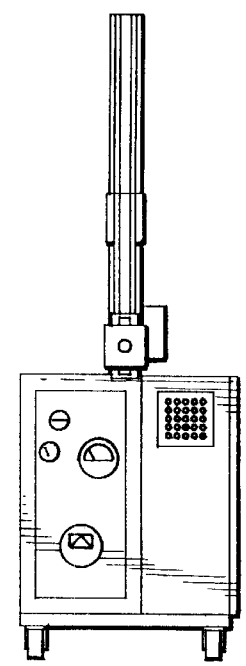
FIG. 52A
FIG. 52B
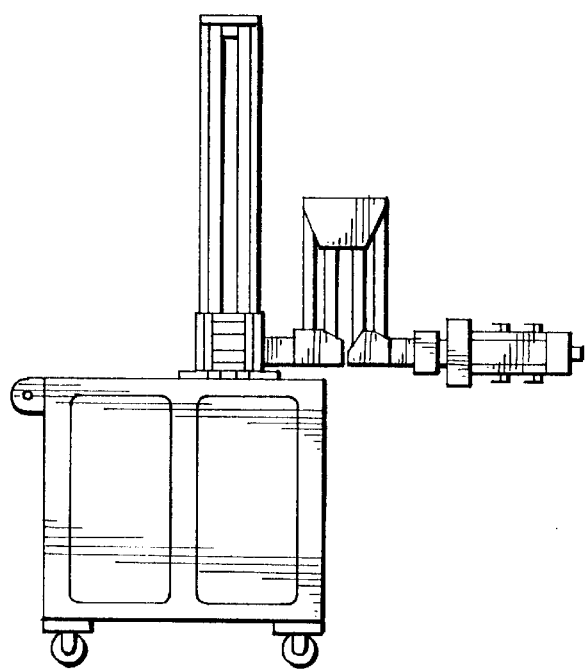
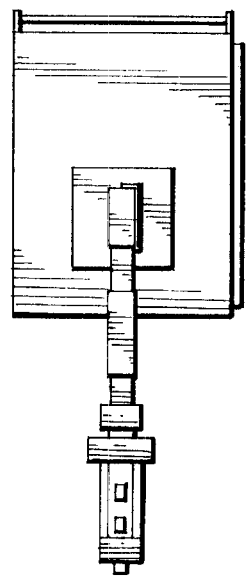
FIG. 52C
FIG. 52D

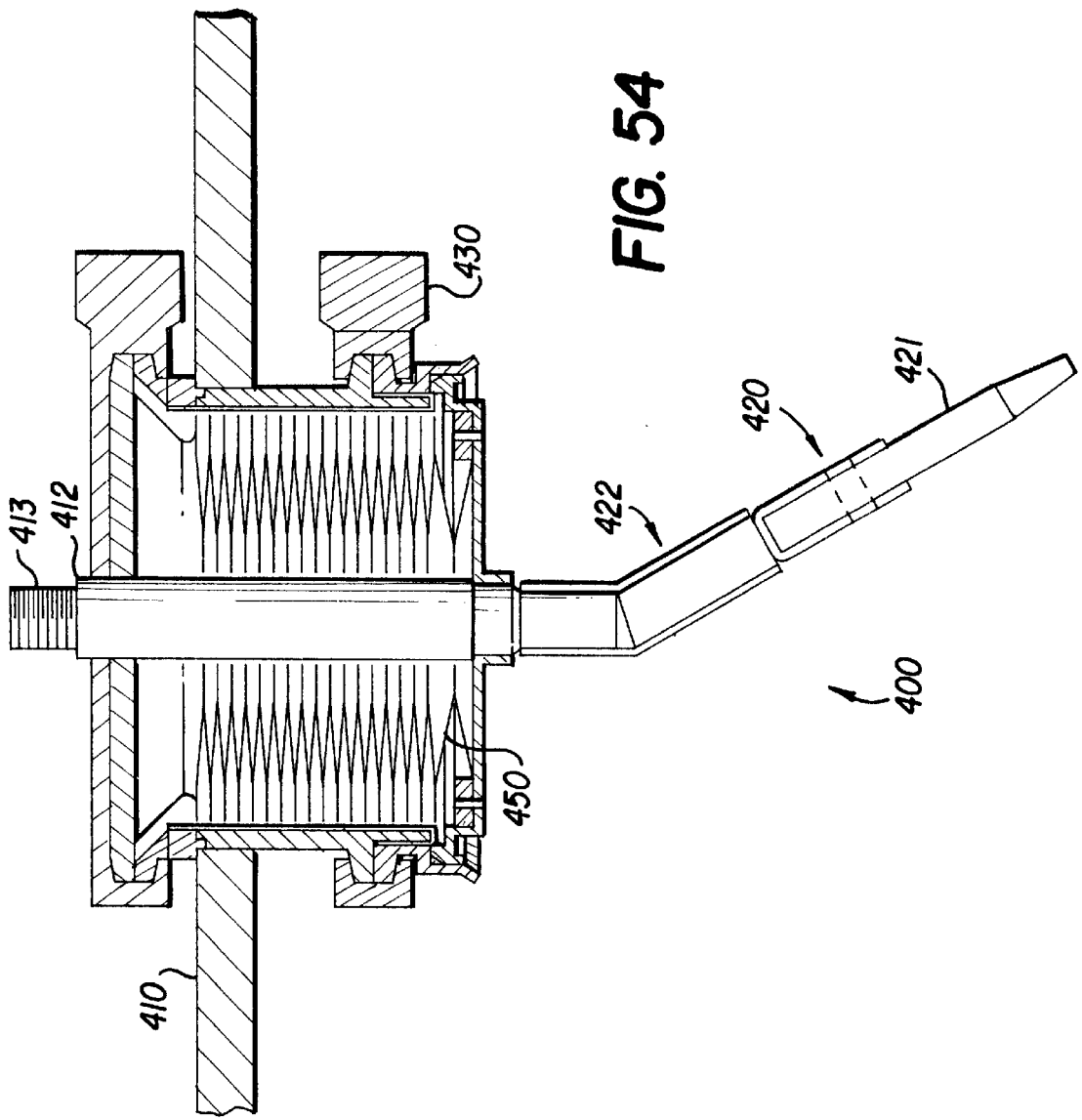

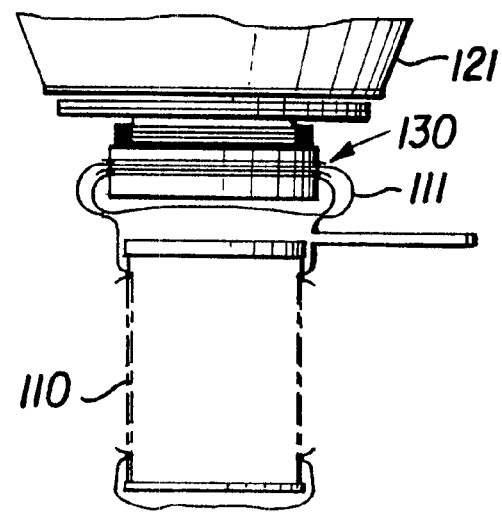
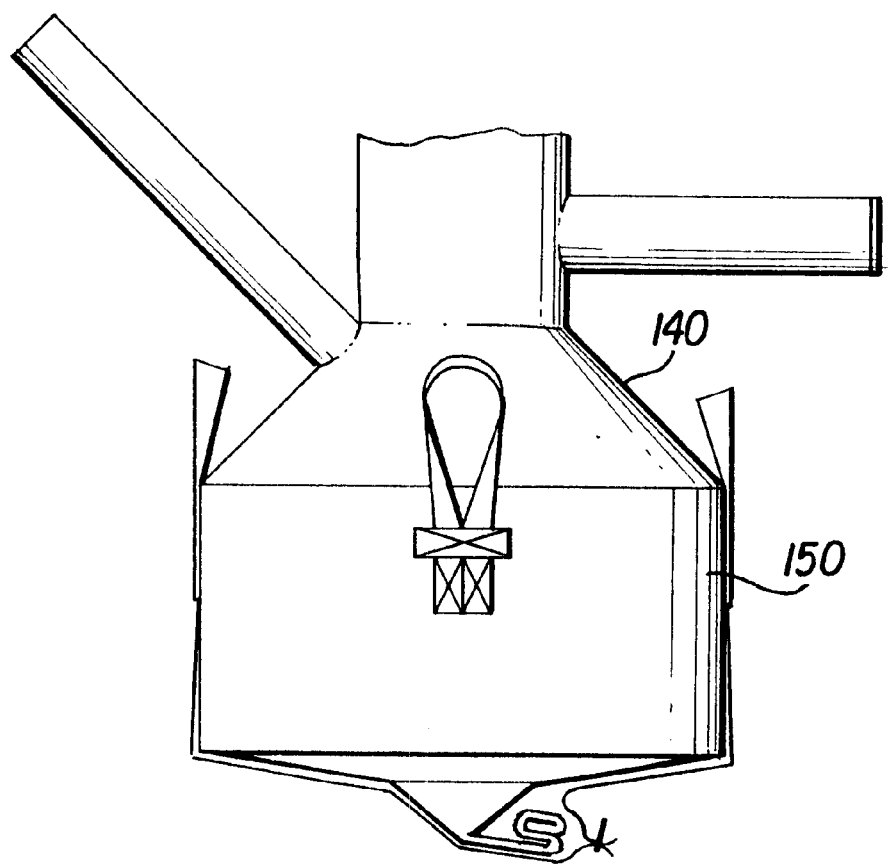
FIG. 60

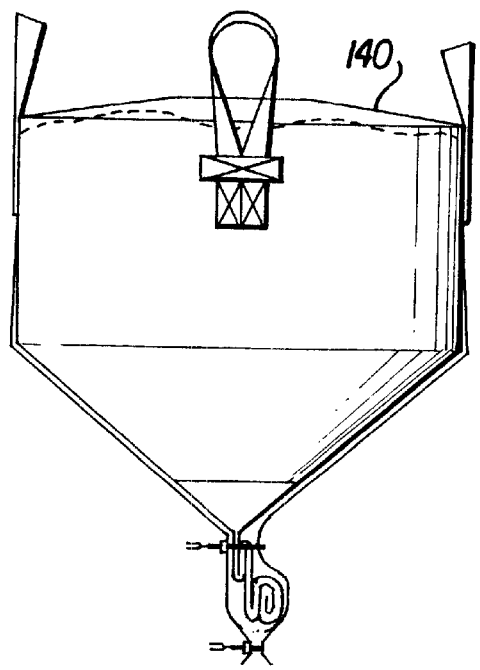
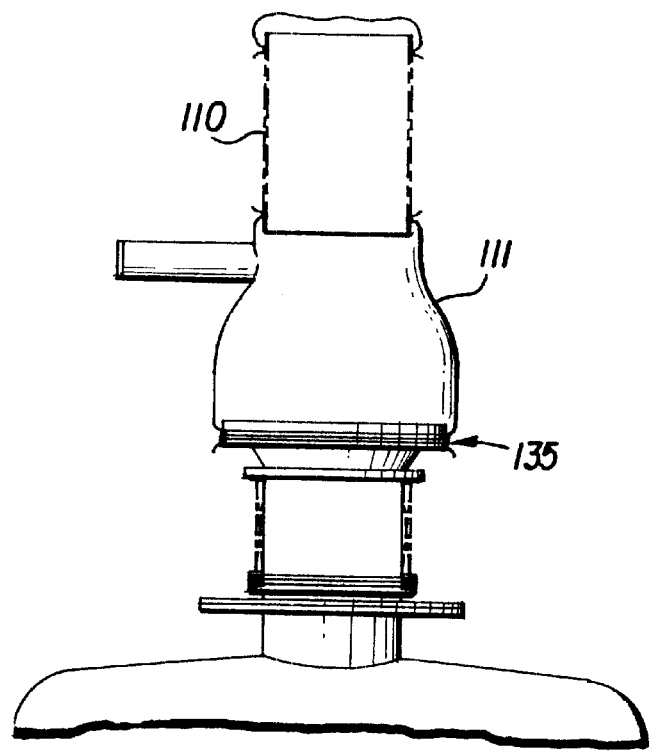
FIG. 61

SYSTEM FOR THE CONTAINED TRANSFER OF PARTICULATES

This application claims the priority of U.S. Provisional Application No. 60/119,455 filed Feb. 10, 1999, and incorporated herein by reference.

BACKGROUND OF THE INVENTION

1. Field of the Invention

This invention relates generally to a system for the contained transfer of particulates. The invention relates more specifically to a method and apparatus for transferring hazardous particulates which facilitate the transfer without either exposure of the operating personnel and the environment to the particulate, or outside contamination of the particulate itself.

2. Description of Related Art

In the processing of particulate materials, the particulates must typically be transferred to and from processing equipment, transfer systems, and storage containers. In the pharmaceutical industry, for example, particulates are transferred from a batch processing vessel into multiple transfer containers. Typically, this is accomplished not in an automated fashion but rather through a series of manipulative steps performed by plant operators. A transfer container such as a bag is placed on the discharge port of a piece of equipment, the port is opened to fill the bag, the port is closed, the bag is removed, and the top of the bag is secured.

In the processing and material transfer of hazardous particulates, however, such as highly potent pharmaceuticals, the particulates must be transferred without exposure of the operating personnel to the health hazards associated with the pharmaceuticals. In concentrated form, these pure drugs and/or their intermediates pose a serious health hazard. Exposure to as little as parts per million levels of the drugs can result in chronic health problems and even death. Heretofore, the material transfer was accomplished by personnel wearing personal protective equipment, i.e., full-body protective suits and respirators. Such protective equipment, however, is cumbersome, hot, and uncomfortable to wear; requires operator time to don and doff; and must be washed and incinerated after use.

Additionally, for two reasons, it is desirable that the transfer of such particulate materials be accomplished in a contained manner. First, it is often necessary to protect the particulates themselves from environmental contamination. Second, the particulates being transferred in applications such as the processing of pharmaceuticals are often in a very concentrated state, and the accumulated loss during a series of transfer steps can have a substantial negative impact on the economics of the process.

The means for securing the top of filled transfer containers such as plastic bags has conventionally consisted of twisting the material of the bag lengthwise and tying it off with a wire or plastic closure. While a means for securing the bags by a method such as heat sealing would be more reliable, faster, and convenient, the processing environment has heretofore precluded the use of a conventional heat seal machine. Because of the presence of both flammable gases and combustible dusts resulting from uncontained particulates, the potential for explosion resulting from arcs, sparks, and high temperature exposed surfaces has rendered the use of heat sealing impossible.

In order to provide for the contained transfer of particulates, one conventional process employs a continuous tube of flexible material that is packed onto the discharge port of a vessel. The bottom of the tube is secured by twisting and tying, and the first of a series of bags is filled. The material above the filled bag is then twisted, a lower and an upper tie are applied, and the filled bag is detached by cutting the twisted material between the ties. The material above the upper tie then forms the bottom of the next bag to be filled. While this method provides for some containment of material, a significant potential for exposure arises during the step of cutting the twisted material between the ties. Additionally, an exposure problem arises when the supply of tube is depleted. That is, when it is necessary to remove the top of a tube from the discharge port, the presence of particulate on the tube and the port necessitates that the operators don protective gear. Furthermore, this method fails to address the mechanics of discharging the contents of the filled bag into a vessel in a subsequent processing step.

Furthermore, particulates such as those employed in the pharmaceutical industry are often used in conjunction with solvents and tend to agglomerate within a vessel. In view of the aforementioned value associated with the particulates, however, it is highly desirable to discharge the entire contents of a vessel. Conventionally, if the contents of a vessel were not discharging properly, the vessel would be opened and operators in protective gear would either rod the vessel or enter the vessel to facilitate the discharge. Either method, however, not only interrupts the process but can pose a danger to the safety of the operators and contaminate the product.

Finally, certain conventional technologies employ stainless steel vessels equipped with hermetically sealed ports for the transfer and storage of pharmaceutical products. Such containers, however, along with all of their associated hardware, are expensive to fabricate. Even more importantly, they must be thoroughly cleaned to remove all traces of the particulate prior to reuse in order to avoid quality issues such as cross-contamination. The cleaning and certification program, however, is expensive and not entirely reliable, as it is extremely difficult to remove all traces of particulate from the container.

As an alternative to stainless steel vessels, at least one conventional technology has employed the continuous tube of flexible material described above. While such a transfer container may be disposable, it must also satisfy the rigorous physical requirements imposed by the pharmaceutical industry. That is, the container must possess the required physical characteristics for the particulate transfer service, namely, antistatic properties, flexibility, and high strength. Conventional containers, however, while exhibiting some combination of some of the desired characteristics, have never possessed all of the properties required for use in a system such as that of the present invention.

SUMMARY OF THE INVENTION

It is an object of the present invention to provide an economical and reliable system for transferring particulates which facilitates the transfer without either exposure of the operating personnel and the environment to the particulate, or environmental contamination of the particulate itself. It is a further object of the present invention to provide a method and apparatus for contained transfer that employ a series of transfer containers. It is an even further object of the present invention to provide an apparatus that is capable of performing a repeatable high temperature material heat seal of a flexible transfer container. It is a still further object of the present invention to provide an apparatus for the contained mechanical breakup of agglomerated particulates in a piece of processing equipment. Finally, it is a still further object of the present invention to provide a transfer container material which possesses the combination of antistatic and mechanical properties required for use in the contained transfer system.

Accordingly, the present invention advantageously relates to a multiple o-ring canister assembly which can be attached to either the discharging port or charging port of a piece of processing equipment. The canister has a series of circumferential o-ring grooves which allows the attachment of a series of individual transfer containers. In a charging mode, for example, once the particulate is charged to the processing equipment, a first transfer container is collapsed and a second transfer container is placed in the next o-ring groove, thereby containing the remaining contaminated section of the first transfer container. The first transfer container is removed through a bag-out sleeve which is an integral part of the second transfer container. The process is repeated in a stepwise fashion by moving to the next groove in the canister until the process equipment is completely charged.

In a second embodiment, the invention relates to a continuous sleeve cartridge assembly which holds a continuous series of transfer containers initially joined top to bottom in a long, sleeve-like manner. After a first transfer container is filled, an area between the first transfer container and a second transfer container is heat sealed closed and the middle of the heat seal is cut to separate the first transfer container from the second. The heat seal forms the top of the first transfer container and the bottom of the second transfer container.

The invention further relates to an apparatus that is capable of performing a repeatable high temperature material heat seal to secure the transfer containers. The invention facilitates the use of heat sealing technology in environments that are classified as hazardous. The device utilizes all necessary precautions to prevent the presence of arcs, sparks, and high temperature exposed surfaces so as to prevent an explosion as a result of the flammable gases and combustible dusts that may be found in such environments. In addition, the apparatus utilizes a dual temperature feedback system to ensure that a complete seal has been produced.

The invention further relates to a rodding apparatus that facilitates the discharge of particulates which may have agglomerated in a piece of processing equipment, such as particulates which have bridged over a discharge valve. The rodding system is installed in the top of the processing equipment, thereby allowing the rodding to be conducted in a contained manner. The device comprises a closure plate which has an integral long rod and blade assembly. Movement of the rod in the x, y, and z axes is accomplished by the use of a long bellows assembly. The closure plate comprises two glass view ports for use with a video camera and light source to facilitate the rodding process.

Finally, the invention further relates to a flexible, thermoplastic, disposable transfer container material which comprises a base resin, an antistatic agent, and a filler. The material not only possesses the necessary combination of antistatic and mechanical properties for use in the contained transfer system, but can be fabricated in various formulations and/or configurations to meet the needs of a specific application.

The advantages associated with the present system are numerous. First, from an exposure standpoint, the invention provides for a "shirt-sleeve" environment in which the full-body protective suits and respirators associated with the conventional methods are unnecessary during discharging and charging operations. Additionally, operator dexterity is enhanced in the shirt-sleeve environment. Second, from a containment standpoint, the invention provides for improved economics resulting from the enhanced recovery of particulates. An even greater economic benefit, however, is that the invention facilitates the processing of high potency compounds in an uncontained processing facility. By providing for continuous containment even when it is necessary to mount subsequent transfer containers, the invention overcomes the prior art problem associated with the presence of particulate on both the tube and the vessel port. Also, the present system solves the mechanics of discharging the contents of a filled bag into a vessel in a subsequent processing step.

Additionally, the improved containment contributes to the possibility of employing heat sealing in an environment which heretofore has contained an unacceptable level of combustible dusts. The rodding apparatus facilitates the contained mechanical breakup of agglomerated particulates while eliminating the risk to operators. Finally, the flexible transfer container itself possesses the necessary combination of properties for use in the present system, while providing a reliable, low cost, and disposable alternative to the conventional stainless steel containers.

BRIEF DESCRIPTION OF THE DRAWINGS

Other objects, features, and advantages of the present invention will become more fully apparent from the following detailed description of the preferred embodiments and the accompanying drawings. As depicted in the attached drawings:

FIG. 4 is a view of a multiple o-ring canister assembly employed in a vessel discharging mode.

FIG. 5 is a view of a multiple o-ring canister assembly employed in a vessel charging mode.

FIG. 14 is a view of the step of discontinuing the inert purge, and heat sealing, cutting, and removing the filled transfer container.

FIG. 15 is a view of the step of repeating the sequence of the steps depicted in FIGS. 6–14.

FIG. 16 is a view of the step of disconnecting the multiple o-ring canister from the vessel discharge flange adapter.

FIG. 17 is a view of the steps of heat sealing, cutting, and removing the bag-out sleeve and canister.

FIG. 18A is a view of the first in a series of manipulative steps in which a multiple o-ring canister with bag-out sleeve and a filled transfer container and its restraint are positioned over a vessel charging flange, and deploying the transfer container discharging sleeve for a vessel charging mode of operation.

FIG. 25 is a view of the step of removing the expanding clamp.

FIG. 26 is a view of the steps of heat sealing, cutting, and removing the empty transfer container.

FIG. 31 is a view of the step of repeating the sequence of the steps depicted in FIGS. 22–25.

FIG. 32 is a view of the steps of heat sealing, cutting, and removing the second empty transfer container.

FIG. 33 is a view of the step of disconnecting the multiple o-ring canister is from the vessel charging flange adapter as the cannister connect sleeve extends.

FIG. 37A is a view of a series of transfer containers packed on a continuous sleeve cartridge.

FIG. 37B is a detail view of a continuous sleeve cartridge restraining strap.

FIG. 38 is a view of a continuous sleeve cartridge assembly employed in a vessel discharging mode.

FIG. 39 is a view of a sampling sleeve of a first transfer container placed into a product stream to allow it to fill with product.

FIG. 40 is a view of the heat seal closing of the filled sampling sleeve of the first transfer container.

FIG. 48A is a view of the third step of compressing the cartridge connect sleeve and attaching the cartridge assembly to the discharge flange assembly of the vessel, and the fourth step of pulling down the first transfer container from the cartridge and placing it in a suspended restraint.

FIG. 48B is a view of the cartridge assembly before the next transfer container has been pulled down from the cartridge.

FIG. 48C is a detail view of an individual transfer container.

FIG. 51A is a view of the ninth step of tying and taping, or heat sealing, and cutting the neck portion of the final transfer container.

FIG. 51B is a view of the tenth step of detaching the spent cartridge assembly from the discharge flange assembly of the vessel, reinserting the vacuum plate, and removing the spent cartridge by using a bag-out procedure.

FIGS. 52A–D comprise views of a heat seal machine with the heat seal arm in a stowed position.

FIG. 54 is a view of a stowed rodding assembly in a piece of processing equipment.

FIGS. 59A–C are detail views of a vessel port assembly which facilitates the insertion of the light source and video camera.

FIG. 60 is a view of a second embodiment of the vessel discharging mode of operation in which the multiple o-ring canister is connected to the vessel discharge flange adapter before the container restraint is suspended from the bottom of the vessel and before the first empty transfer container is secured to the bottom of the multiple o-ring canister.

FIG. 61 is a view of a second embodiment of the vessel charging mode of operation in which the multiple o-ring canister is connected to the vessel charging flange adapter before the first filled transfer container is secured to the top of the multiple o-ring canister.

DESCRIPTION OF THE PREFERRED EMBODIMENTS

The present invention will be disclosed in terms of the currently perceived preferred embodiments thereof. In the following description, the means for containment of the particulates is referred to as a "transfer container." As one skilled in the art can appreciate, the use of the term "transfer container" herein is meant to denote both the bag-like transfer containers employed with the multiple o-ring canister assembly, the originally-joined, continuous "sleeve" of transfer containers employed with the continuous sleeve cartridge assembly, and equivalent structures.

Figure 1:
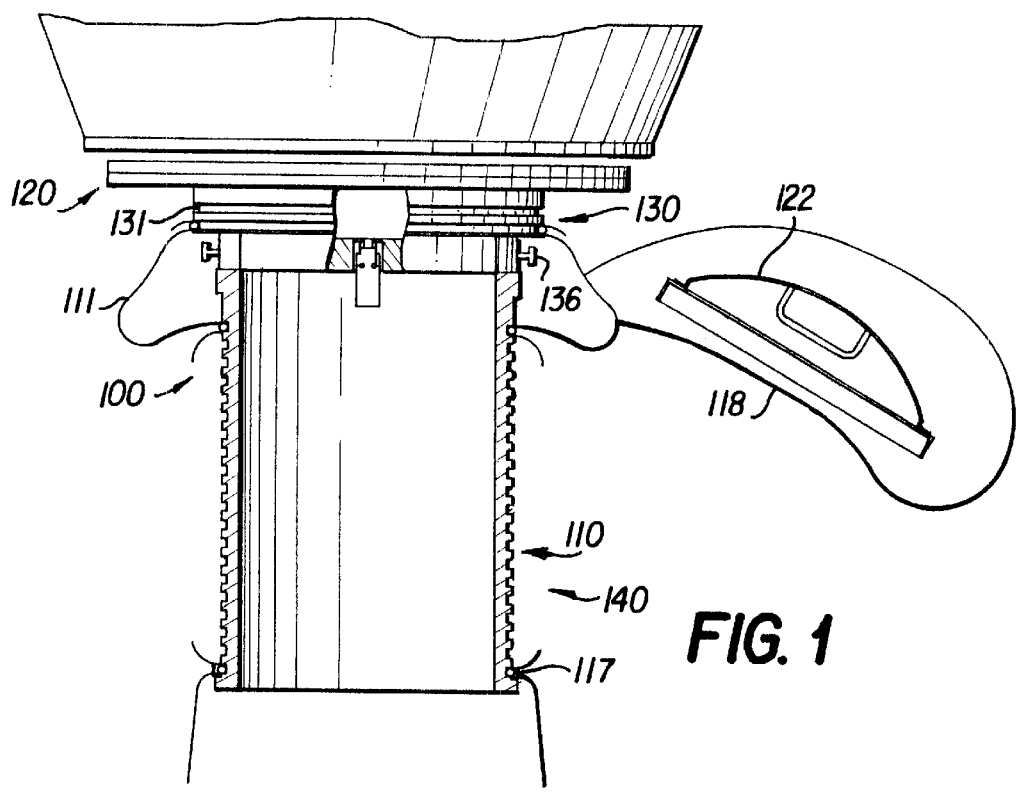
FIG. 1 is a view of a multiple o-ring canister assembly attached to the discharging port of a piece of processing equipment.
Figure 2A:
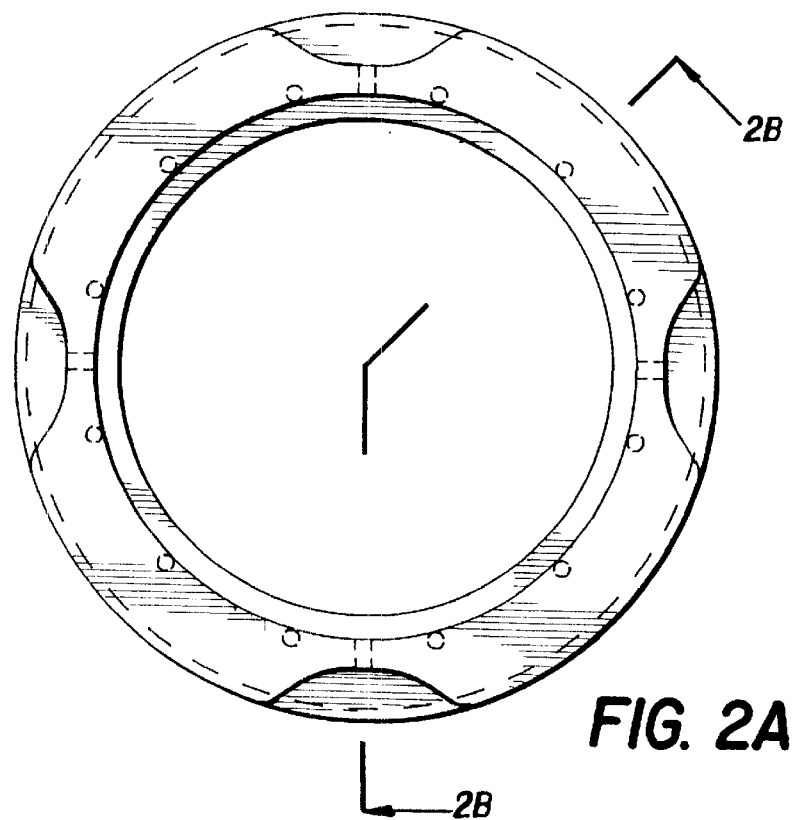
FIGS. 2A–D are views of the disconnect flange of a canister assembly.
Figure 2B:
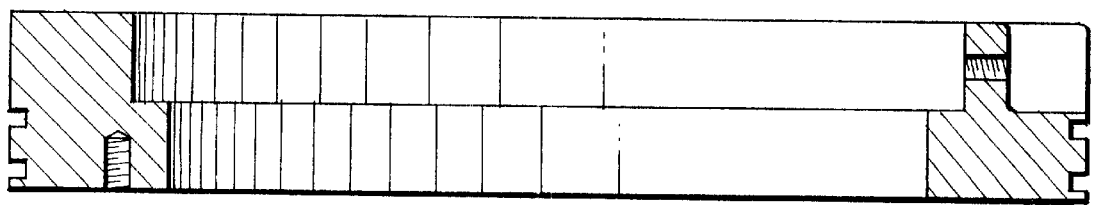
Figure 2C:
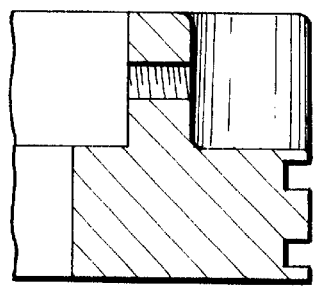
Figure 2D:
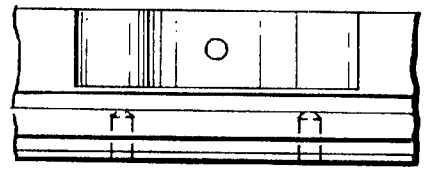
Figure 3:
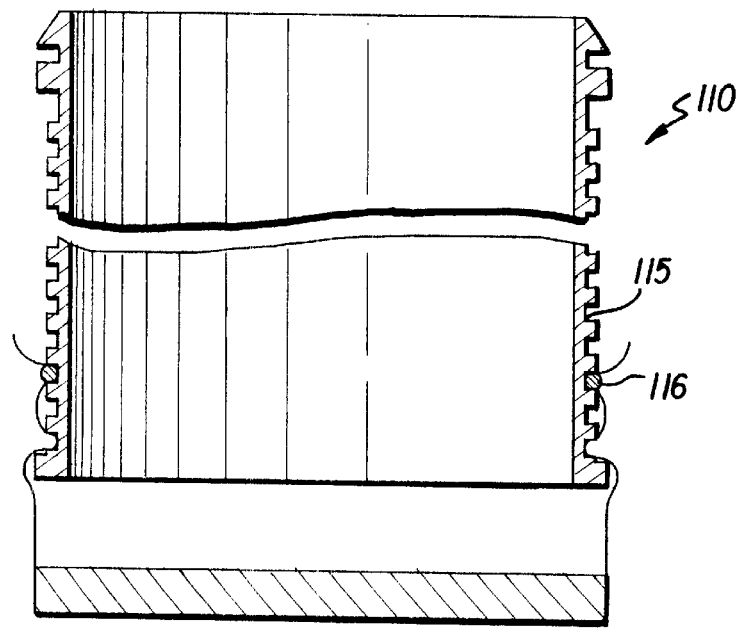
FIG. 3 is a view of a multiple o-ring groove canister.

Referring to FIG. 1, a multiple o-ring canister assembly 100 constructed in accordance with a first preferred embodiment of the present invention is shown. The multiple o-ring canister assembly 100 comprises a canister 110 fabricated from an FDA-approved material such as polypropylene, and can be attached to the charging and/or discharge flange of a piece of particulate processing equipment. In FIG. 1, the canister 110 is attached to the discharge flange 120 by means of the discharge flange adapter 130. The discharge flange adapter 130 depicted in FIGS. 2A–D attaches mechanically to the discharge flange 120 of the processing equipment. The multiple o-ring groove canister 110 depicted in FIG. 3 connects to the discharge flange adapter 130 and is secured with pins 136. A transfer container 140 attaches to the first o-ring groove 115 on the canister 110 and is secured by an o-ring 116 and mechanical clamp 117. Each transfer container 140 comprises a sample sleeve 142 incorporated for sample retention and analysis, and a bag-out sleeve 143 for bag-out operations. Each canister connect sleeve 111 comprises a sleeve 118 to accommodate a vessel's vacuum plate 122 which has been removed during the discharge operation, and a canister connect sleeve bag-out sleeve 112. In FIG. 4 the multiple o-ring canister assembly 100 is employed in a vessel discharging mode, and in FIG. 5 the canister assembly is employed in a vessel charging mode.

In a first embodiment of a vessel discharging mode, i.e., discharging the contents of a vessel into the transfer containers 140, the method of filling the transfer containers comprises a series of manipulative steps. First, a first transfer container charging sleeve 141 is attached to a first o-ring groove 115 of the multiple o-ring canister 110, and the multiple o-ring canister assembly 100 is installed on the discharge flange of the processing equipment. An inert gas such as nitrogen is introduced to fill the empty transfer container, thereby providing it with shape and facilitating its uniform indexing to the restraint 150 which supports it.

The discharge valve on the processing equipment is opened, allowing product to flow into the transfer container. During this time, the sampling sleeve 142 depicted in FIG. 4 is placed into the product stream allowing it fill with product. The sleeve 142 is then heat sealed closed or wire tied and cut off to separate the product sample without contamination. After the first transfer container 140 is filled, the top is heat sealed closed or wire tied and cut off. A charging sleeve film stub 149 remains on the bottom of the canister 110 keeping the process equipment sealed from the environment.

A second transfer container is placed over the charging sleeve film stub 149 of the first transfer container and is secured in a second o-ring groove of the canister 110. The charging sleeve film stub 149 of the first container is removed from the multiple o-ring canister 110, and is contained in the bag-out sleeve 143. The bag-out sleeve 143 is heat sealed or wire tied, cut, and removed. The discharge process is then started for the second container.

This process is repeated until the entire contents of the processing equipment is dispensed, attaching the next transfer container to the next groove in the multiple o-ring canister. This process is repeated for as many grooves as there are on the canister without ever exposing a contaminated section of the canister or transfer container.

A new canister 110 is used for each batch of product; the first canister is removed by disconnecting the canister 110 from the discharge flange adapter 130. A canister connect sleeve 111 which is attached to the canister 110 by clamp 165 connects the canister to the discharge flange adapter 130. The canister connect sleeve 111 is heat sealed or wire tied, cut, and removed. A canister connect sleeve film stub 113 remains connected to the discharge flange adapter 130, thus sealing the process equipment from the environment. The replacement canister 110 has a canister connect sleeve 111 that is attached to a second o-ring groove 131 in the discharge flange adapter 130. This encapsulates the first canister connect sleeve film stub 113 allowing removal of the film stub 113 from the discharge flange adapter 130 through a canister connect sleeve bag-out sleeve 112. The canister connect sleeve bag-out sleeve 112 is heat sealed or wire tied, cut, and removed. This process is repeated for all batches in a campaign.

The sequence of manipulative steps associated with the first embodiment of the vessel discharging mode of operation is further illustrated in FIGS. 6–17. In Step 1 depicted in FIG. 6, the multiple o-ring canister 110 with canister connect sleeve 111 and the empty transfer container 140 and its restraint 150 are positioned under a vessel discharge flange 120. In Step 2 depicted in FIG. 7, the transfer container charging sleeve 141 is secured by means of an o-ring 116 to the first groove 115 of the multiple o-ring canister 110. In Step 3 depicted in FIG. 8, the container restraint 150 is suspended from the bottom of the vessel 121 by a means for suspending such as restraint fabric straps 151 which engage hooks suspended from the vessel, and the canister connect sleeve 111 is connected to the vessel discharge flange adapter 130. In Step 4 depicted in FIG. 9, the canister connect sleeve film stub 113, which serves to ensure the containment of particulate on the discharge flange, is bagged out and tied off to both secure the film stub 113 in the sleeve 112, and to preclude the buildup of product in the sleeve. In Step 5 depicted in FIG. 10, the canister connect sleeve 111 compresses as the multiple o-ring canister 110 is connected to the vessel discharge flange adapter 130. An inert gas such as nitrogen is then introduced to fill the empty transfer container, thereby providing it with shape and facilitating its uniform indexing to the restraint 150.

Figure 11:
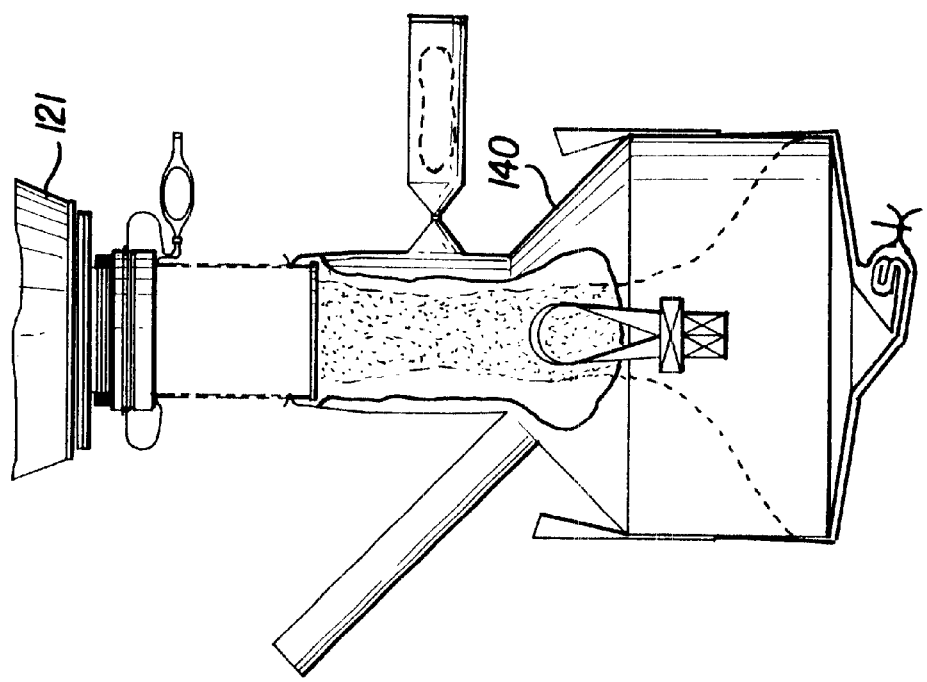
FIG. 11 is a view of the step of establishing product flow from the vessel into the transfer container.
Figure 12:
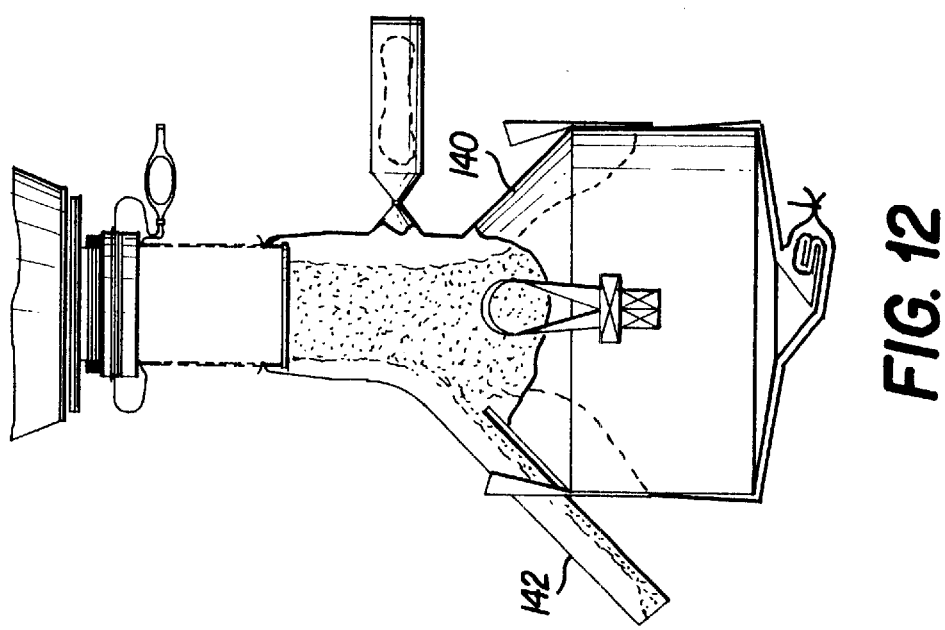
FIG. 12 is a view of the optional step of filling the product sample sleeve.

In Step 6 depicted in FIG. 11, product flow from the vessel 121 into the transfer container 140 is established, and in Step 7 depicted in FIG. 12, which is optional, the product sample sleeve 142 can be filled. If the sampling option has been used, Step 8, depicted in FIG. 13, comprises the steps of heat sealing with a heat seal machine 300, cutting, and removing the filled portion 144 of the sample sleeve 142.

Once the transfer container 140 has been filled, Step 9, depicted in FIG. 14 comprises the steps of discontinuing the inert purge, and heat sealing, cutting, and removing the filled transfer container. As depicted in FIG. 14, the bottom of the heat seal 146 closes the top of the transfer container, and the top of the heat seal establishes the bottom of the charging sleeve film stub 149 on the bottom of the canister 110. In Step 10, the sequence of Steps 1–9 is then repeated. As described above, the second transfer container is placed over the film stub of the first transfer container and is secured in a second o-ring groove of the canister. This process is repeated until the entire contents of the processing equipment is dispensed, attaching the next transfer container to the next groove in the multiple o-ring canister. This process is repeated for as many grooves as there are on the canister.

In Step 11 depicted in FIG. 16, the multiple o-ring canister 110 is disconnected from the vessel discharge flange adapter 130. Step 12, depicted in FIG. 17, comprises the steps of heat sealing, cutting, and removing the canister connect sleeve 111 and canister 110. As depicted in FIG. 17, the bottom of the heat seal 191 closes the top of the canister connect sleeve 111, and the top of the heat seal establishes the bottom of the canister connect sleeve film stub 113 left on the bottom of the vessel discharge flange adapter 130. This process can be repeated for as many canisters as are required to accommodate the contents of a vessel.

In a second embodiment of the vessel discharging mode of operation, the multiple o-ring canister is connected to the vessel discharge flange adapter before the container restraint is suspended from the bottom of the vessel and before the first empty transfer container is secured to the bottom of the multiple o-ring canister. This second embodiment, therefore, facilitates the ease of connection of the canister connect sleeve to the vessel discharge flange adapter.

Figure 9:
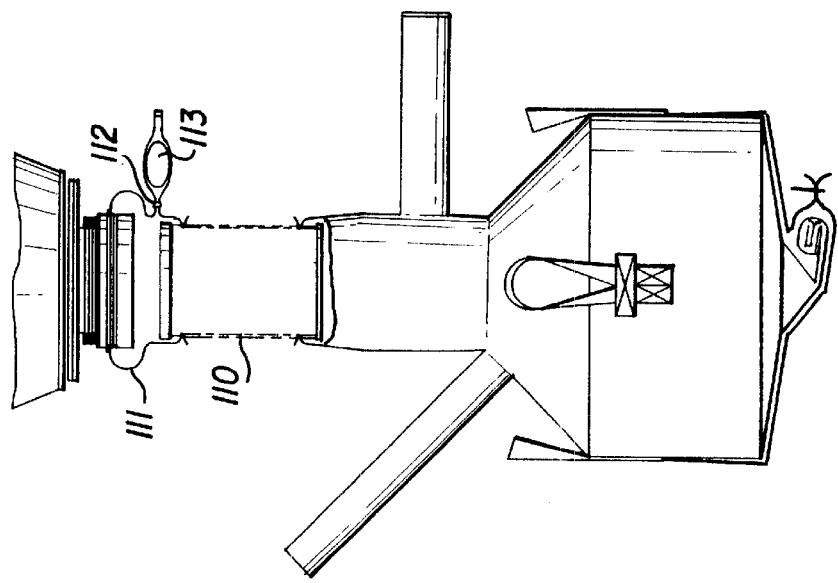
FIG. 9 is a view of the step of bagging out and tying off the film stub.
Figure 8:
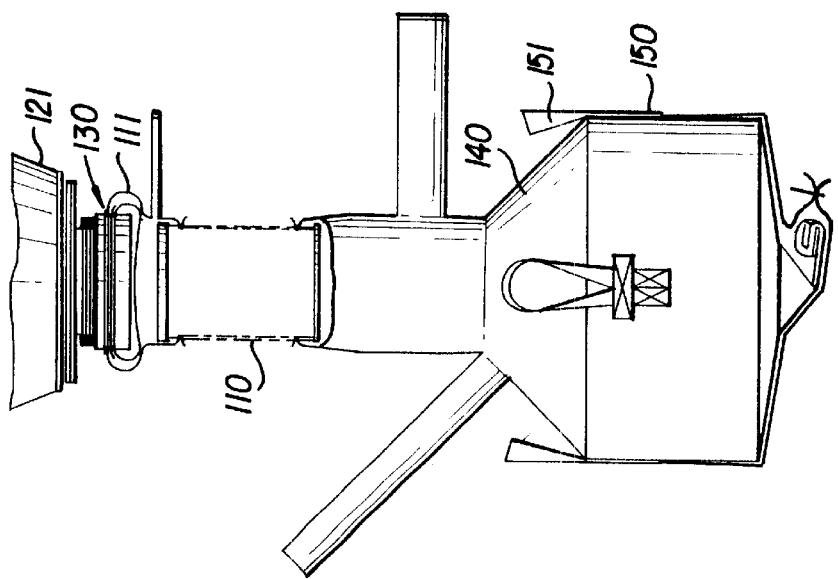
FIG. 8 is a view of the step of suspending the container restraint from the bottom of the vessel and connecting the cannister connect sleeve to the vessel discharge flange adapter.
Figure 10:
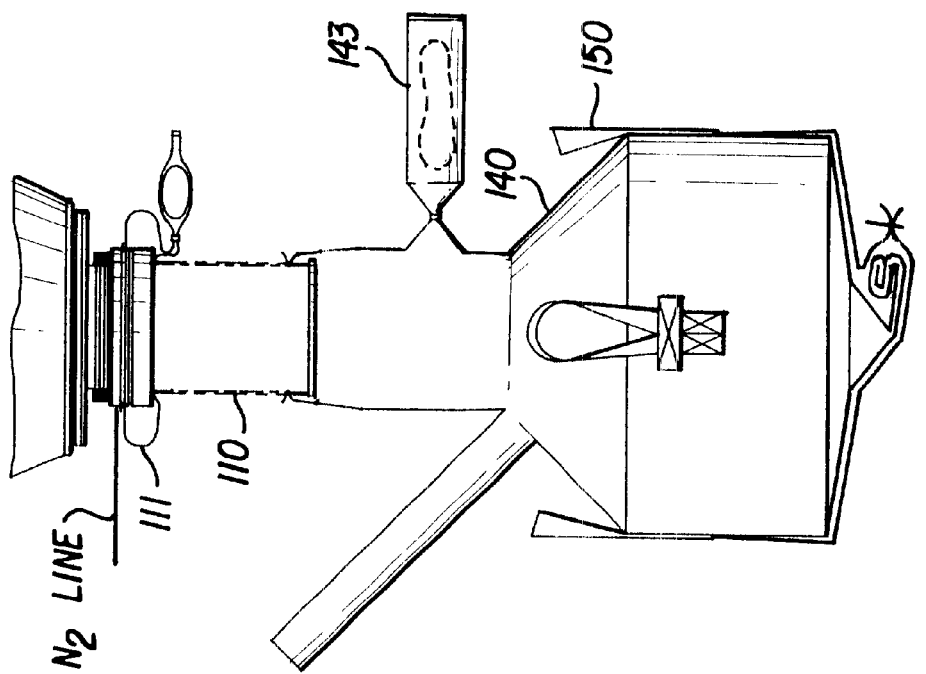
FIG. 10 is a view of the step of connecting the multiple o-ring canister to the vessel discharge flange adapter and introducing the flow of an inert gas to the transfer container.
Figure 13:
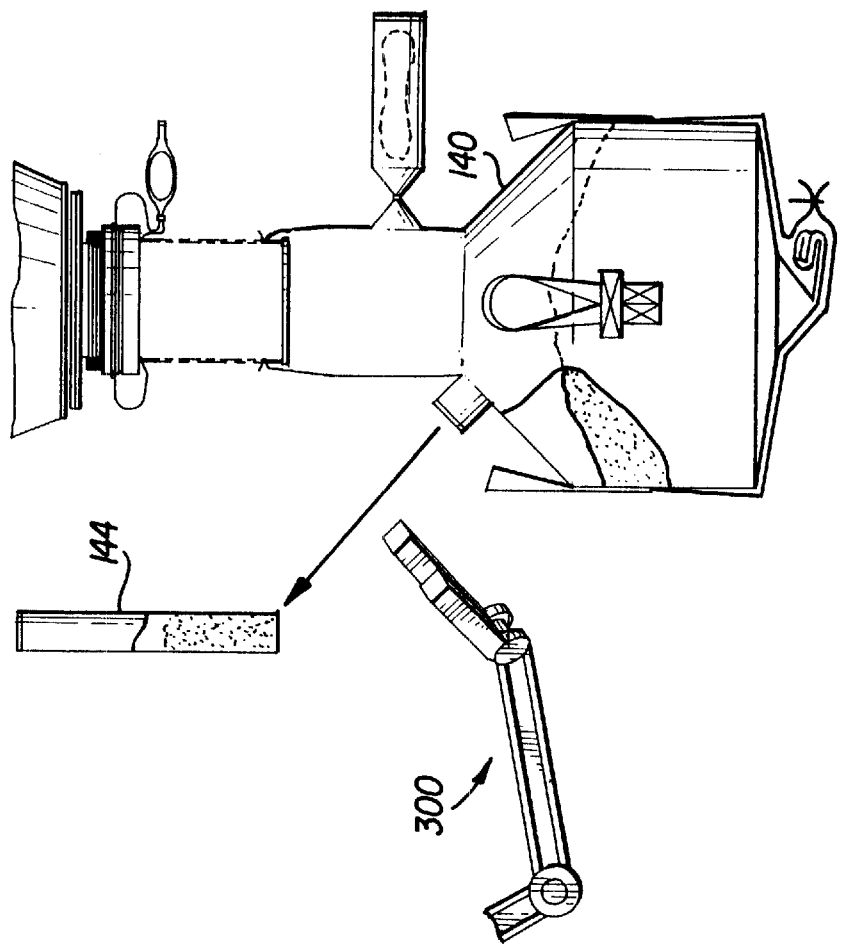
FIG. 13 is a view of the steps of heat sealing, cutting, and removing the filled portion of the sample sleeve.

In this second embodiment of the vessel discharging mode, the first in a series of manipulative steps is to connect the canister connect sleeve 111 to the vessel discharge flange adapter 130 (FIG. 60). The canister connect sleeve film stub 113, which serves to ensure the containment of particulate on the discharge flange, is bagged out and tied off to both secure the film stub 113 in the sleeve 112, and to preclude the buildup of product in the sleeve (as described above in conjunction with the first embodiment of the discharging mode and as depicted in FIG. 9). Then, the canister connect sleeve 111 compresses as the multiple o-ring canister 110 is connected to the vessel discharge flange adapter 130 (as described above in conjunction with the first embodiment of the discharging mode and as depicted in FIG. 10).

Figure 7:
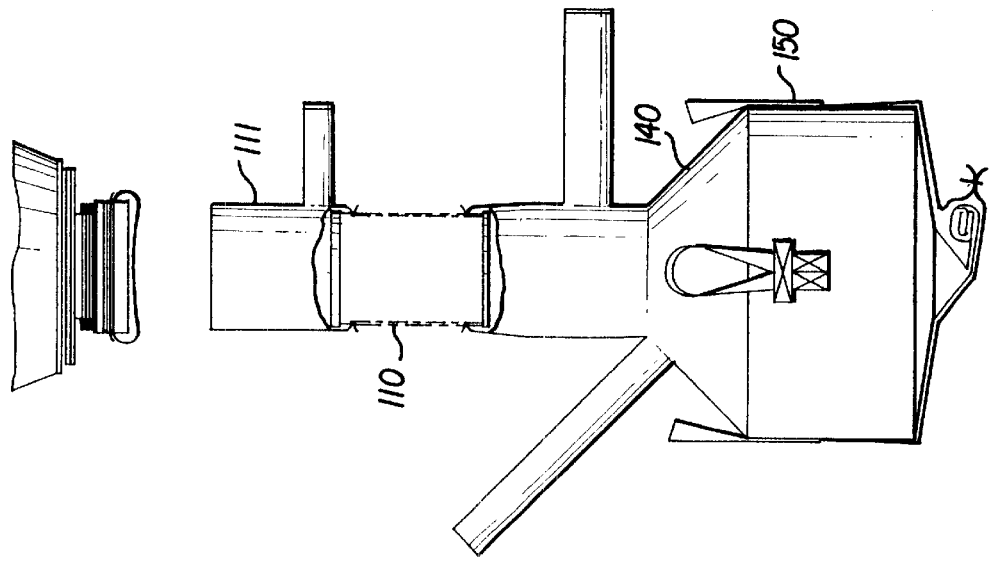
FIG. 7 is a view of a the step of securing the transfer container charging sleeve by means of an o-ring to the first groove of the multiple o-ring canister.
Figure 6:
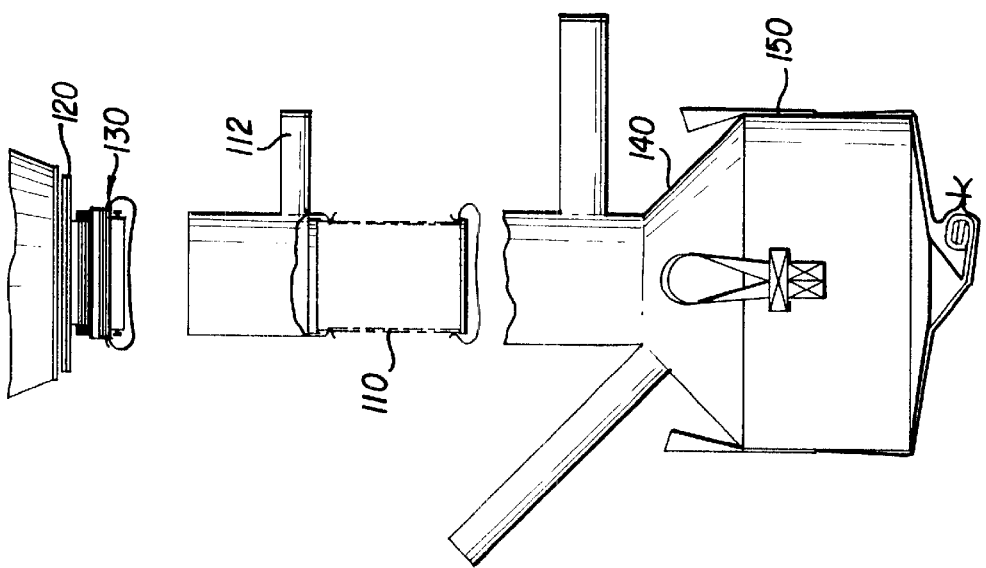
FIG. 6 is a view of the first in a series of manipulative steps in which a multiple o-ring canister with cannister connect sleeve and the empty transfer container and its restraint are positioned under a vessel discharge flange for a vessel discharging mode of operation.

The empty transfer container 140 and its restraint 150 are then positioned under the already secured multiple o-ring canister 110. The container restraint 150 is suspended from the bottom of the vessel 121, and the transfer container charging sleeve 141 is secured by means of an o-ring 116 to the first groove 115 of the multiple o-ring canister 110 (as described above in conjunction with the first embodiment of the discharging mode and as depicted in FIG. 7). An inert gas such as nitrogen is then introduced to fill the empty transfer container, thereby providing it with shape and facilitating its uniform indexing to the restraint 150.

The series of manipulative steps employed in this second embodiment of the vessel discharging mode is fully analogous to that in the first embodiment of the vessel discharging mode once the transfer container charging sleeve has been secured to the multiple o-ring canister. That is, the steps depicted in FIGS. 10 through 17 are performed as described above in conjunction with the first embodiment of the vessel discharging mode.

Figure 19A:
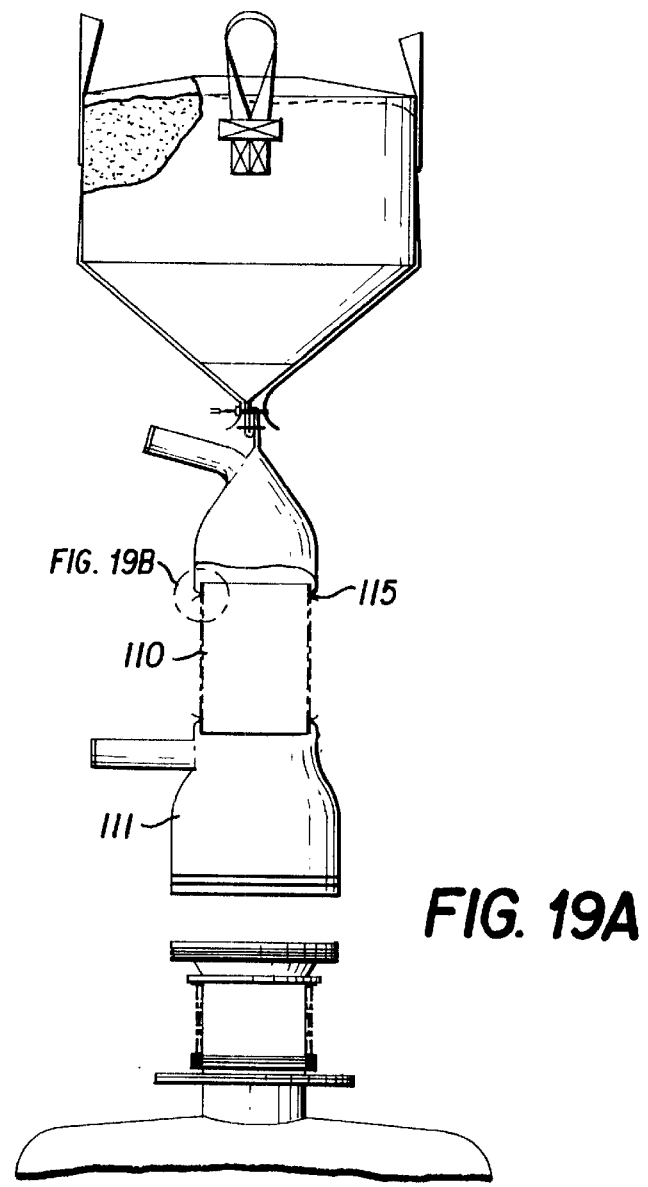
FIG. 19A is a view of the step of securing the transfer container discharging sleeve by means of an o-ring to the first groove of the multiple o-ring canister.

In a first embodiment of a vessel charging mode, i.e., discharging the contents of a series of transfer containers into a vessel 121, the method of charging the vessel comprises a series of manipulative steps. In a charging mode, once the multiple o-ring canister 110 is installed on the charging flange adapter 135 of the processing equipment, the first transfer container 140 is attached to the first, or in this orientation, top, o-ring groove 115 of the canister 110 as depicted in FIG. 19. A tie cord 161 is released on the discharging sleeve 160 of the transfer container allowing product to flow into the processing equipment. When the contents of the transfer container are completely dispensed, the restraint portion 150 of the transfer container is removed. The transfer container is then collapsed and folded into a small package. The first transfer container is placed into a bag-out sleeve located in the discharge neck of the second transfer container. It is then heat sealed or wire tied, cut, and removed. The procedure is repeated until the processing equipment is completely charged. This procedure never allows a contaminated surface of the transfer container or the canister to be exposed.

A new canister is used for each batch of product. The first canister is disconnected from the charging flange adapter 135, removed, and the new canister is introduced by using a bag out procedure as described for the discharge process.

Figure 18B:
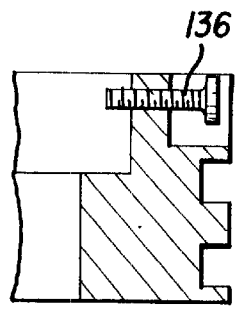
FIG. 18B is a detail view of a vessel charging flange adapter.
Figure 18C:
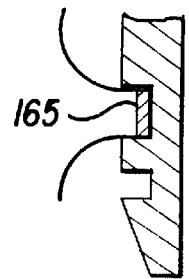
FIG. 18C is a detail view of the multiple o-ring canister and a clamp.
Figure 18D:
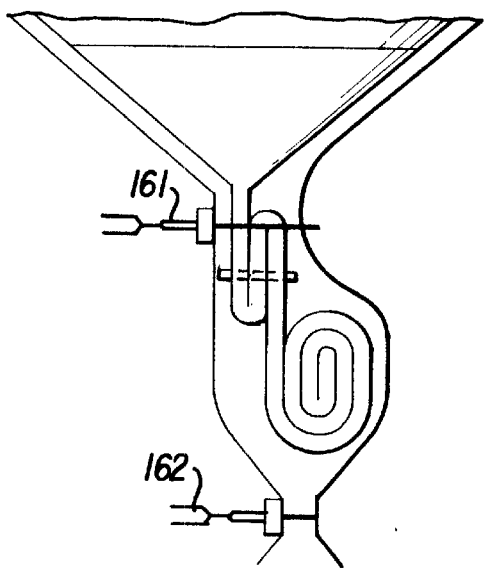
FIG. 18D is a detail view of a transfer container discharging sleeve.
Figure 19B:
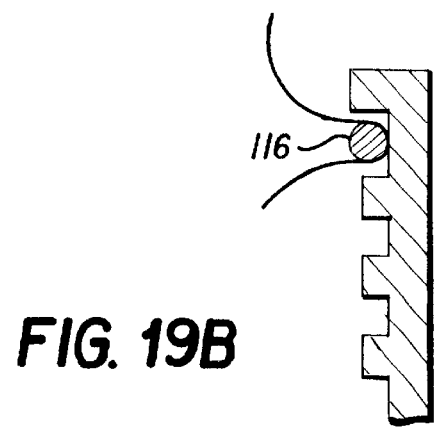
FIG. 19B is a detail view of the transfer container discharging sleeve, the o-ring, and the multiple o-ring canister.
Figures 20A, 20B:
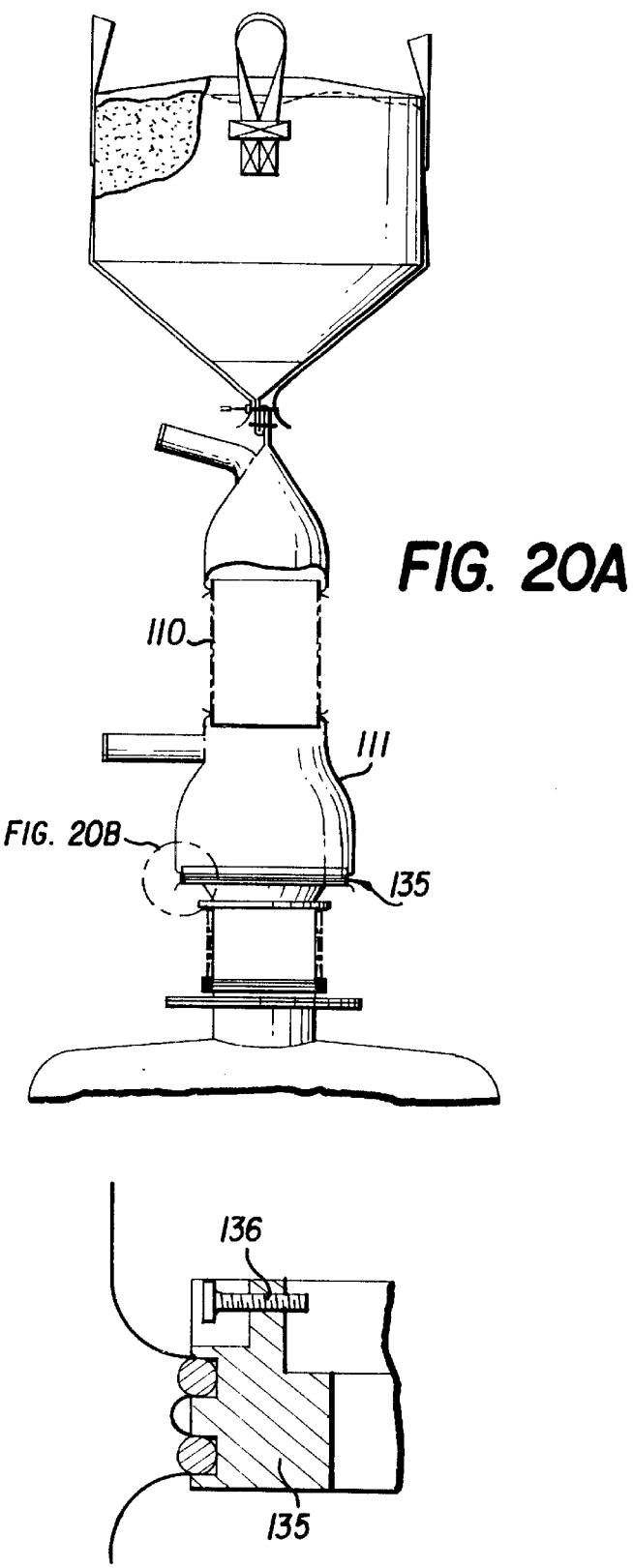
FIG. 20A is a view of the step of connecting the cannister connect sleeve to the vessel charging flange adapter.
FIG. 20B is a detail view of the cannister connect sleeve and the vessel charging flange adapter.
Figure 21A:
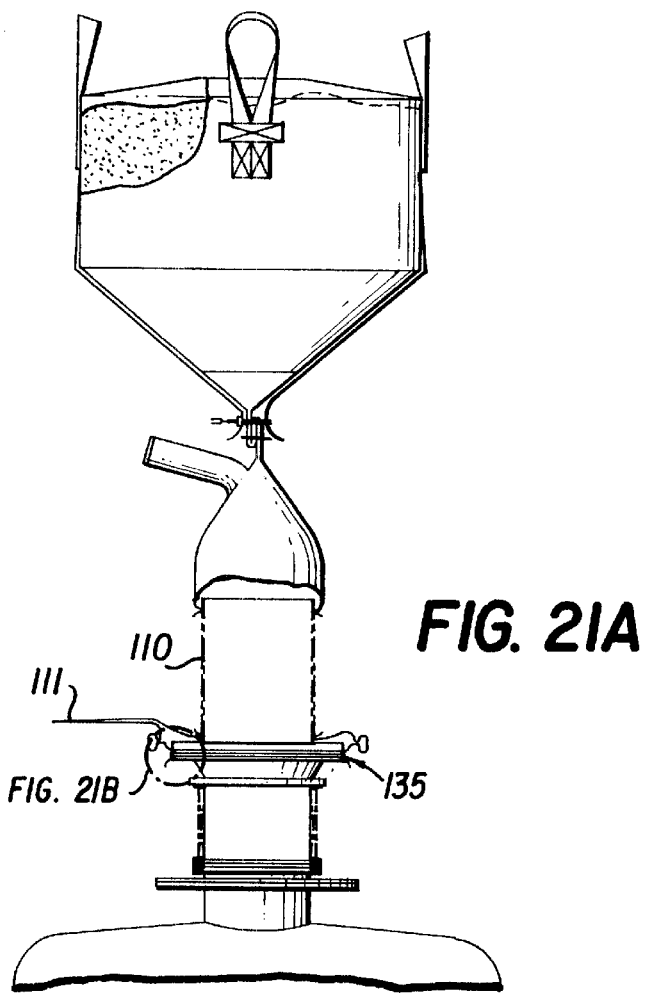
FIG. 21A is a view of the step of connecting the multiple o-ring canister to the vessel charging flange adapter as the cannister connect sleeve collapses and compresses.
Figure 21B:
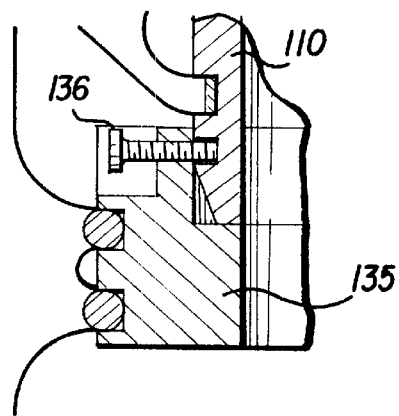
FIG. 21B is a detail view of the multiple o-ring canister connected to the vessel charging flange adapter.

The sequence of manipulative steps associated with the first embodiment of the vessel charging mode of operation is further illustrated in FIGS. 18–34. In Step 1 depicted in FIG. 18A, the multiple o-ring canister 110 with canister connect sleeve 111 and the filled transfer container 140 and its restraint 150 are positioned over a vessel charging flange 123. The lower restraint 162 depicted in FIG. 18D is released in order to allow the transfer container discharging sleeve 160 to deploy. In Step 2 depicted in FIG. 19A, the transfer container discharging sleeve 160 is secured by means of an o-ring 116 to the first groove 115 of the multiple o-ring canister 110. FIG. 19B is a detail view of the transfer container discharging sleeve, the o-ring, and the multiple o-ring canister. In Step 3 depicted in FIG. 20A, the canister connect sleeve 111 is connected to the vessel charging flange adapter 135 and secured with pins 136 (FIG. 20B). In Step 4 depicted in FIG. 21A, the multiple o-ring canister 110 is connected to the vessel charging flange adapter 135, and the canister connect sleeve 111 collapses and compresses. FIG. 21B is a detail view of the multiple o-ring canister connected to the vessel charging flange adapter. The canister connect sleeve film stub 113 is then bagged out and tied off.

Figure 22A:
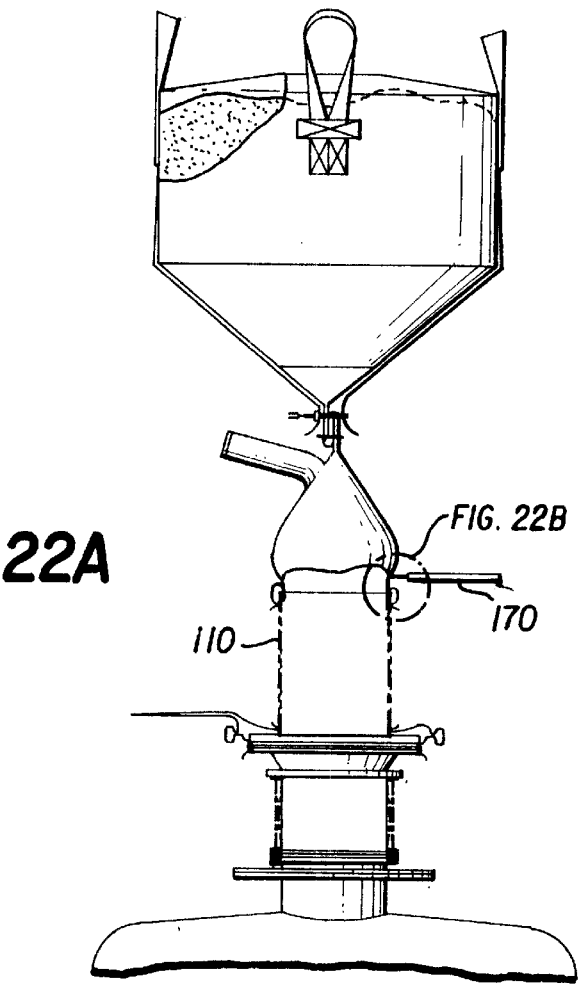
FIG. 22A is a view of the step of actuating an expanding clamp on the top of the canister.
Figure 22B:
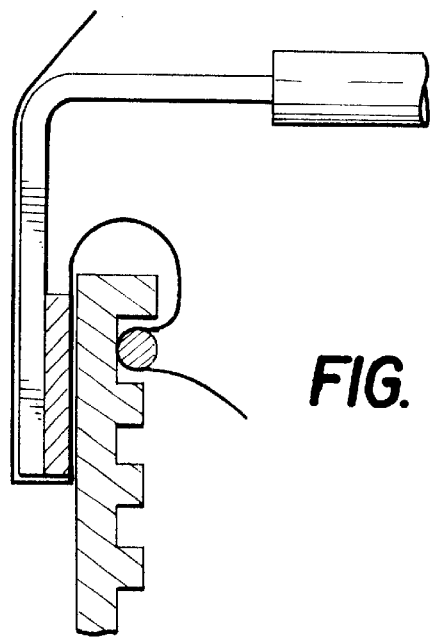
FIG. 22B is a detail view of the expanding clamp on the top of the canister.
Figure 24:
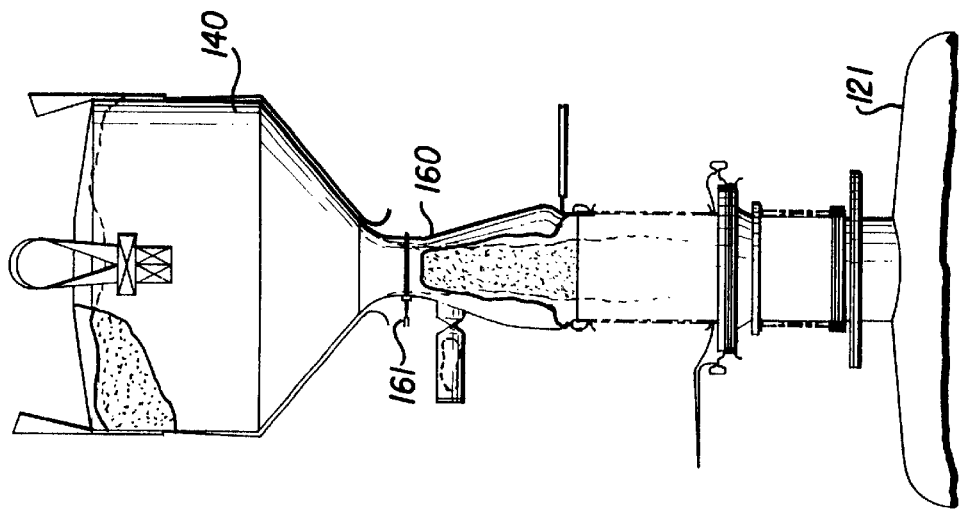
FIG. 24 is a view of the step of establishing flow from the filled transfer container to the vessel being charged, and controlling the rate of flow from the transfer container through the application of tension to the cord around the discharging sleeve.
Figure 23:
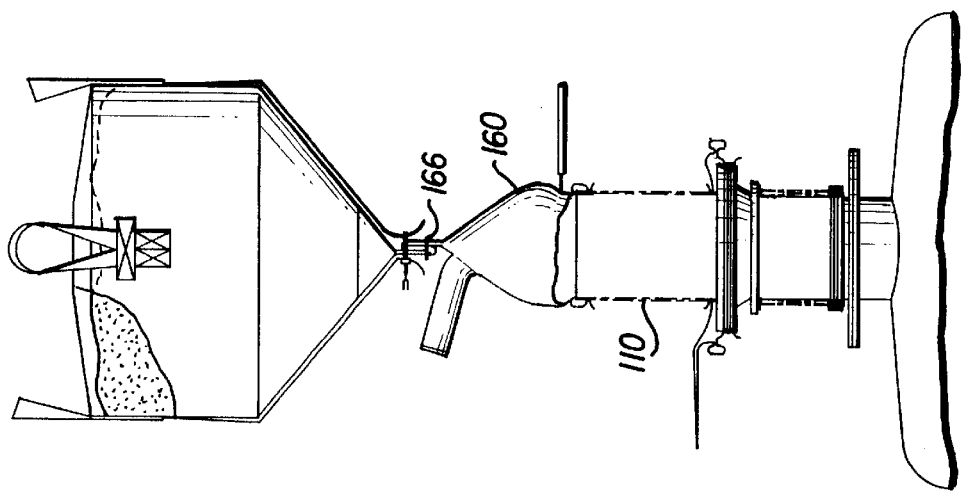
FIG. 23 is a view of the step of untying the S-fold in the discharging sleeve of the transfer container.
Figure 28:
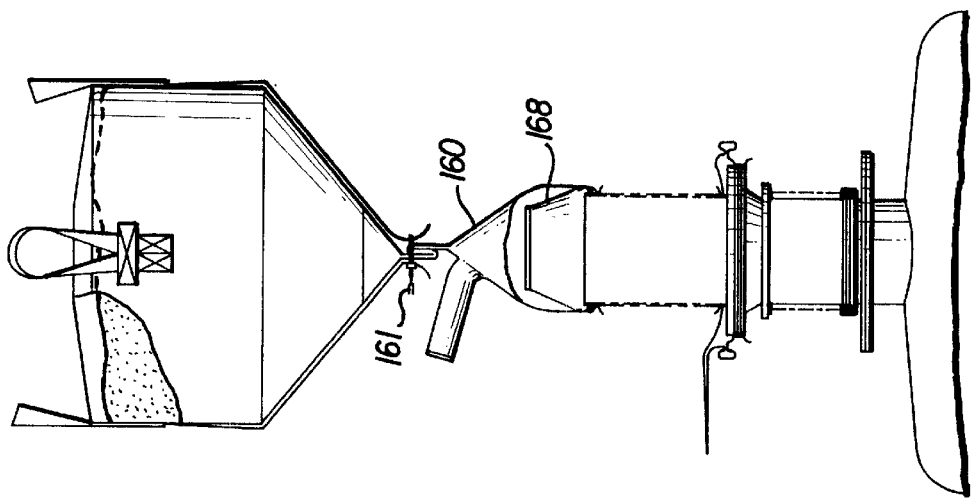
FIG. 28 is a view of the step of securing the second transfer container discharging sleeve by means of an o-ring to the second groove of the multiple o-ring canister so as to cover the film stub.

In Step 5 depicted in FIG. 22A, an expanding clamp 170 (FIG. 22B) on the top of the canister 110 is actuated so as to prevent the accumulation of particulates on the top face of the canister. In Step 6 depicted in FIG. 23, the S-fold 166 in the discharge sleeve 160 of the transfer container is untied, and in Step 7 depicted in FIG. 24, flow from the filled transfer container 140 to the vessel 121 being charged is established. The rate of flow from the transfer container 140 is controlled through the application of tension to the restraint cord 161 around the discharge sleeve 160 depicted in FIG. 24. Once the transfer container 140 has been emptied, Step 8, depicted in FIG. 25, comprises removal of the expanding clamp 170. Step 9, depicted in FIG. 26, comprises the steps of heat sealing, cutting, and removing the empty transfer container 140. As depicted in FIG. 26, the bottom of the heat seal establishes the top of the discharging sleeve film stub 168 left on the top of the canister 110 and the top of the heat seal 167 closes the bottom of the empty transfer container.

Figure 27:
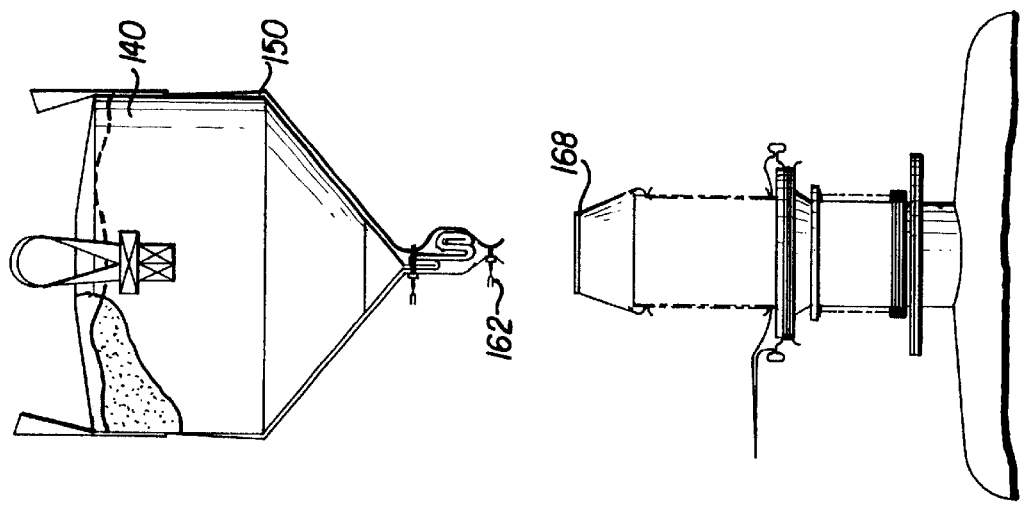
FIG. 27 is a view of the step of positioning a second filled transfer container and its restraint over the heat sealed film stub left on the top of the canister.
Figure 30:
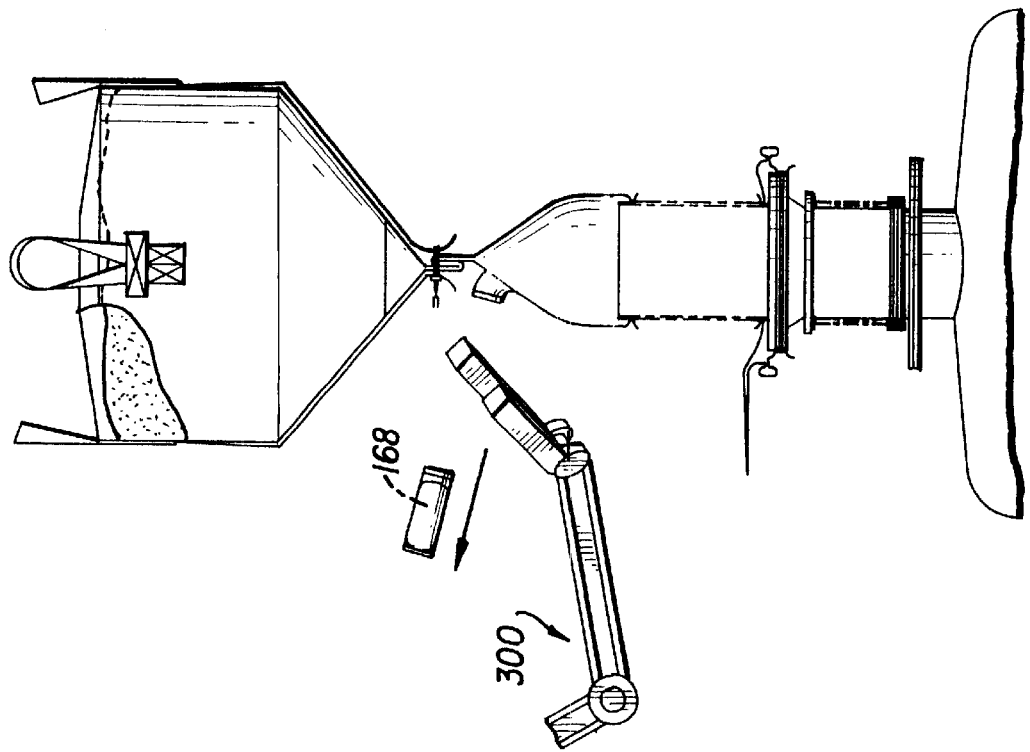
FIG. 30 is a view of the steps of heat sealing, cutting, and removing the bagged-out film stub.
Figure 29:
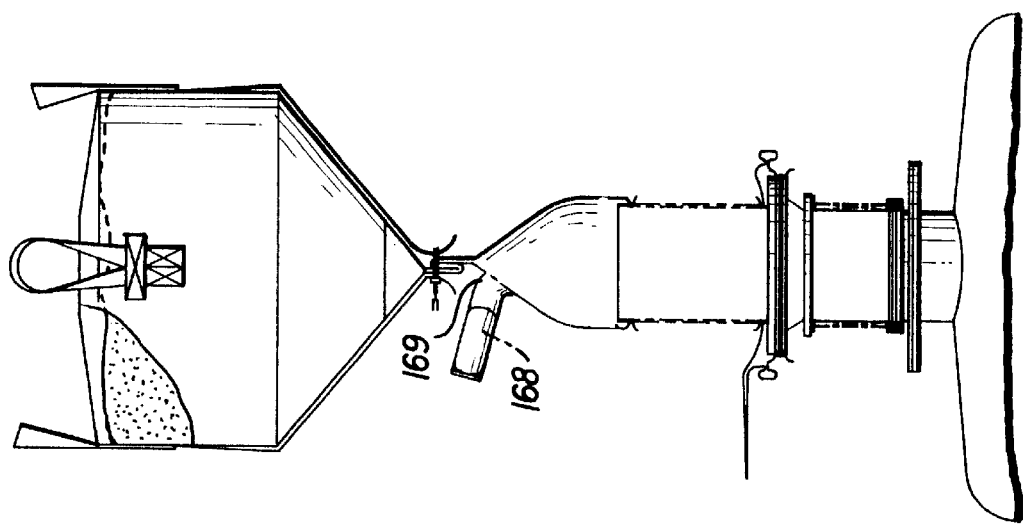
FIG. 29 is a view of the step of removing the heat sealed film stub from the top of the canister and placing it in the bag-out sleeve of the transfer container discharging sleeve.

In Step 10 depicted in FIG. 27, a second filled transfer container 140 and its restraint 150 are positioned over the discharging sleeve film stub 168 left on the top of the canister 110. The lower restraint 162 is released in order to allow the second transfer container discharging sleeve 160 to deploy, and in Step 11 depicted in FIG. 28, the transfer container discharging sleeve 160 is secured by means of an o-ring 116 to the second groove 115 of the multiple o-ring canister 110, thus covering the discharging sleeve film stub 168. In Step 12 depicted in FIG. 29, the discharging sleeve film stub 168 is removed from the top of the canister 110 and placed in the discharging sleeve bag-out sleeve 169 of the transfer container discharging sleeve 160. Step 13, depicted in FIG. 30, comprises heat sealing, cutting, and removing the bagged-out discharging sleeve film stub 168. Step 14 comprises repeating Steps 5–8 for the second transfer container. Step 15, depicted in FIG. 32, comprises the steps of heat sealing, cutting, and removing the second empty transfer container.

Figure 34:
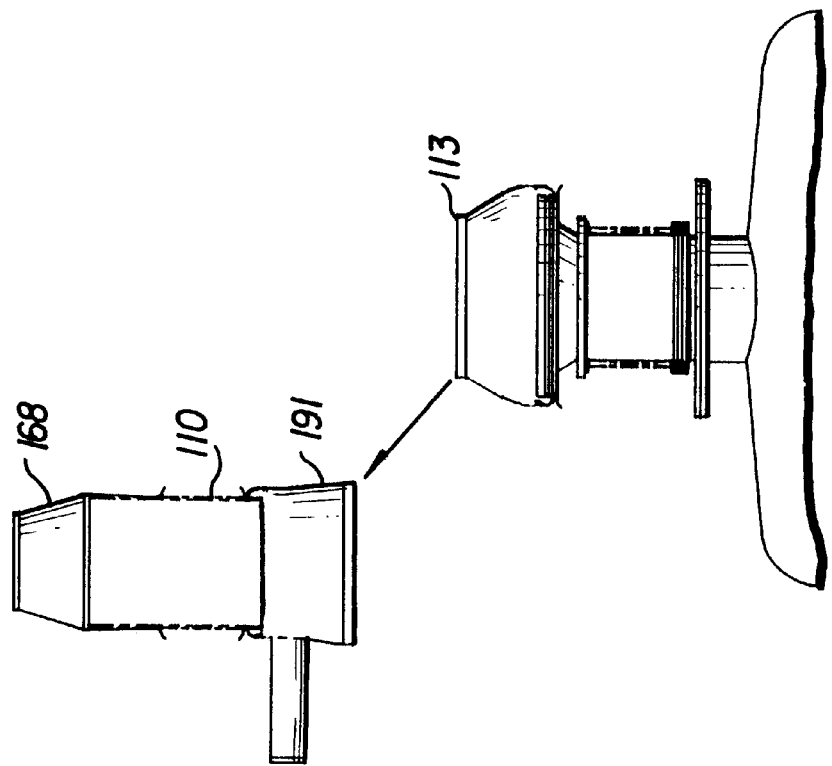
FIG. 34 is a view of the steps of heat sealing, cutting, and removing the cannister connect sleeve and canister.

In Step 16 depicted in FIG. 33, the multiple o-ring canister 110 is disconnected from the vessel charging flange adapter 135 and the canister connect sleeve 111 extends. Step 17, depicted in FIG. 34, comprises the steps of heat sealing, cutting, and removing the canister connect sleeve 111 and canister 110. As depicted in FIG. 34, the top of the heat seal closes the bottom of the canister connect sleeve 111, and the bottom of the heat seal establishes the top of the canister connect sleeve film stub 113 left on the top of the vessel charging flange adapter 135. This process can be repeated for as many canisters as are required to charge a vessel.

In a second embodiment of the vessel charging mode of operation, the multiple o-ring canister is connected to the vessel charging flange adapter before the first filled transfer container is secured to the top of the multiple o-ring canister. This embodiment, therefore, facilitates the ease of connection of the canister connect sleeve to the vessel charging flange adapter.

In this second embodiment of the vessel charging mode, the first in a series of manipulative steps is to connect the canister connect sleeve 111 to the vessel charging flange adapter 135 (FIG. 61). The canister connect sleeve film stub 113 (as described above in conjunction with the first embodiment of the charging mode and as depicted in FIG. 34), is bagged out and tied off. Then, the canister connect sleeve 111 compresses as the multiple o-ring canister 110 is connected to the vessel charging flange adapter 135 (as described above in conjunction with the first embodiment of the charging mode and as depicted in FIG. 20A).

The filled transfer container 140 and its restraint 150 are then positioned over the already secured multiple o-ring canister 110. The lower restraint 162 is released in order to allow the transfer container discharging sleeve 160 to deploy (as described above in conjunction with the first embodiment of the charging mode and as depicted in FIGS. 18A and D). The transfer container discharging sleeve 160 is secured by means of an o-ring 116 to the first groove 115 of the multiple o-ring canister 110 (as described above in conjunction with the first embodiment of the charging mode and as depicted in FIG. 19).

The series of manipulative steps employed in this second embodiment of the vessel charging mode is fully analogous to that in the first embodiment of the vessel charging mode once the transfer container discharging sleeve has been secured to the multiple o-ring canister. That is, the steps depicted in FIGS. 22 through 34 are performed as described above in conjunction with the first embodiment of the vessel charging mode.

From the foregoing description, it is evident that throughout the specification, where the use of the first embodiment of each mode of operation (i.e., vessel discharging mode and vessel charging mode) has been described, the second embodiment of each mode of operation could alternatively be employed.

Thus, the invention comprises: i) the use of a multiple o-ring canister that allows the attachment of successive individual transfer containers without breach of containment, never exposing a contaminated surface during the connect and disconnect processes; ii) a discharge flange adapter for attachment of a multiple o-ring canister; iii) a dispensing canister with a circular cross section that allows the transfer containers to be mounted on the outside of the canister and product to flow through the inside to fill each transfer container; iv) integral sampling ports in each transfer container; v) a removable canister system; and vi) heat sealing for closure of the transfer container. In an optional embodiment, a tape, a wire, or a draw cord closure is employed instead of heat sealing.

Figure 35:
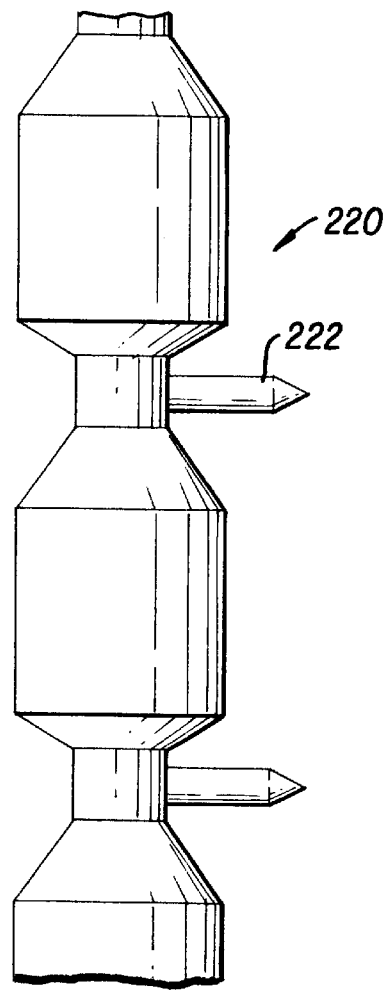
FIG. 35 is a view of a continuous series of transfer containers joined top to bottom for use with a continuous sleeve cartridge assembly.
Figure 36:
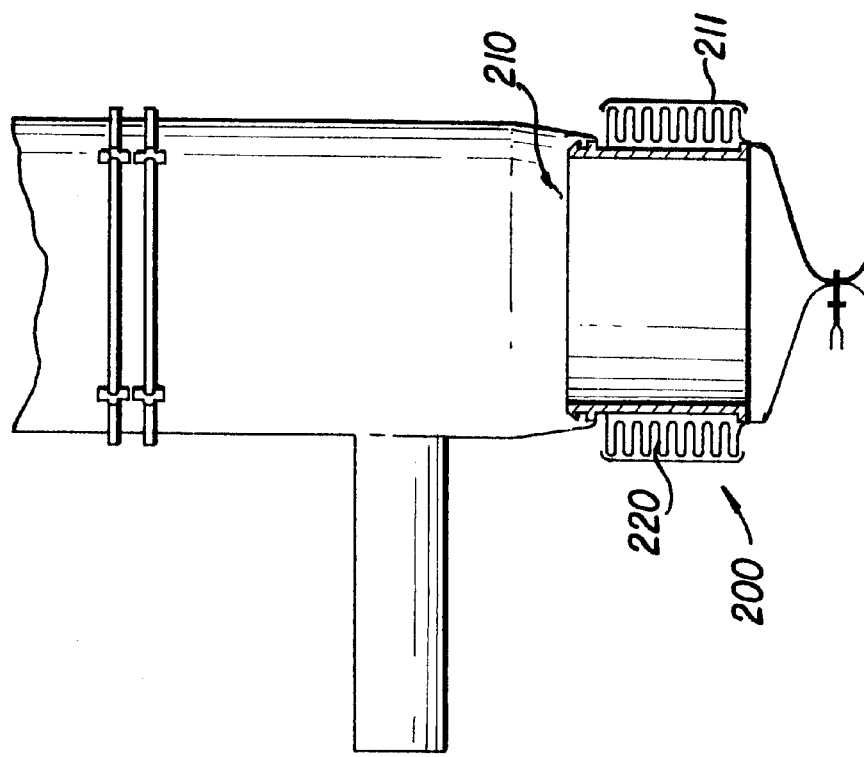
FIG. 36 is a view of a continuous sleeve cartridge assembly.

Referring to FIG. 36, a continuous sleeve cartridge assembly 200 constructed in accordance with a second preferred embodiment of the present invention is shown. The continuous sleeve cartridge assembly 200 comprises a cartridge 210 fabricated from an FDA-approved material such as polypropylene, a fabric shroud 211, and restraining straps 212. The fabric shroud 211 envelops a sleeve-like series 220 of individual transfer containers 221 as depicted in FIG. 35, which is fabricated joined top to bottom. The sleeve-like series 220 of transfer containers is compressed and packed around the circumference of the cartridge 210 as depicted in FIG. 37A. The bottom of the first transfer container 221 is heat sealed during fabrication. Each transfer container 221 comprises a sample sleeve 222 incorporated for sample retention and analysis, and a bag-out sleeve 223 for bag-out operations. Each cartridge connect sleeve 230 comprises a sleeve 231 to accommodate a vessel's vacuum plate 122 which has been removed during the discharge operation, and a cartridge connect sleeve bag-out sleeve 232.

FIG. 38 is a view of a continuous sleeve cartridge assembly 200 employed in a vessel discharging mode. In a vessel discharging mode, the method of filling the transfer containers comprises a series of manipulative steps. First, a cartridge connect sleeve 230 is attached to the discharge flange adapter 240 of the processing equipment, then the cartridge 210 is mounted on the discharge flange adapter 240. Prior to the filling operation, a first transfer container 221 is pulled down out of the cartridge 210 and placed in a restraint 250 such as a drum, a fiber drum, or a fabric restraint. An inert gas such as nitrogen is introduced to fill the empty transfer container 221, thereby providing it with shape and facilitating its uniform indexing to the restraint 250 which supports it. The discharge valve on the processing equipment is then opened allowing product to flow into the first transfer container 221.

Figure 41:
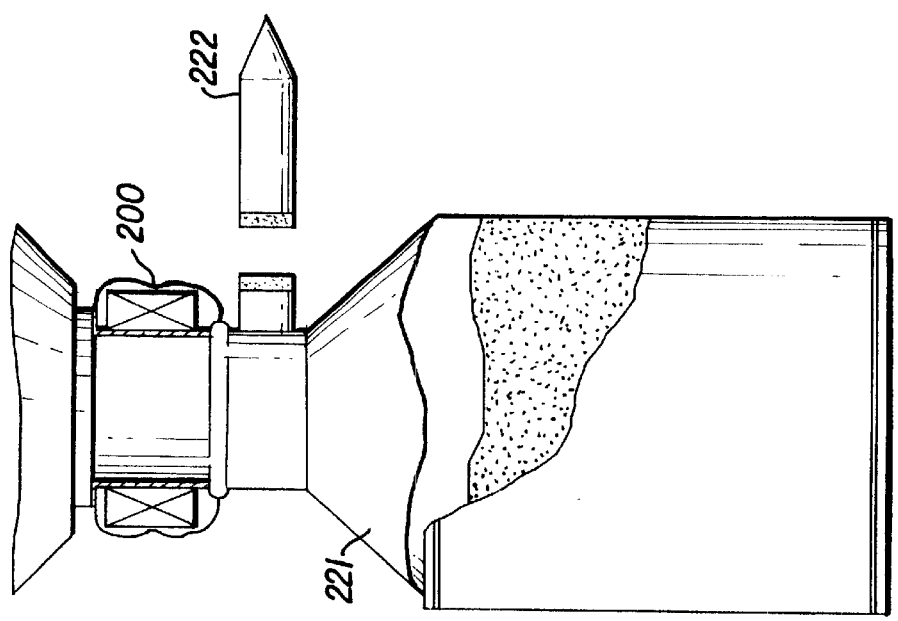
FIG. 41 is a view of detaching by cutting the filled sampling sleeve of the first transfer container.

While the product flows into the transfer container 221, the sampling sleeve 222 can optionally be placed into the product stream allowing it to fill with product as depicted in FIG. 39. The sleeve 222 is then heat sealed closed with a heat seal machine 300 as depicted in FIG. 40 and cut off as depicted in FIG. 41, to separate the product sample without contamination.

Figure 42:
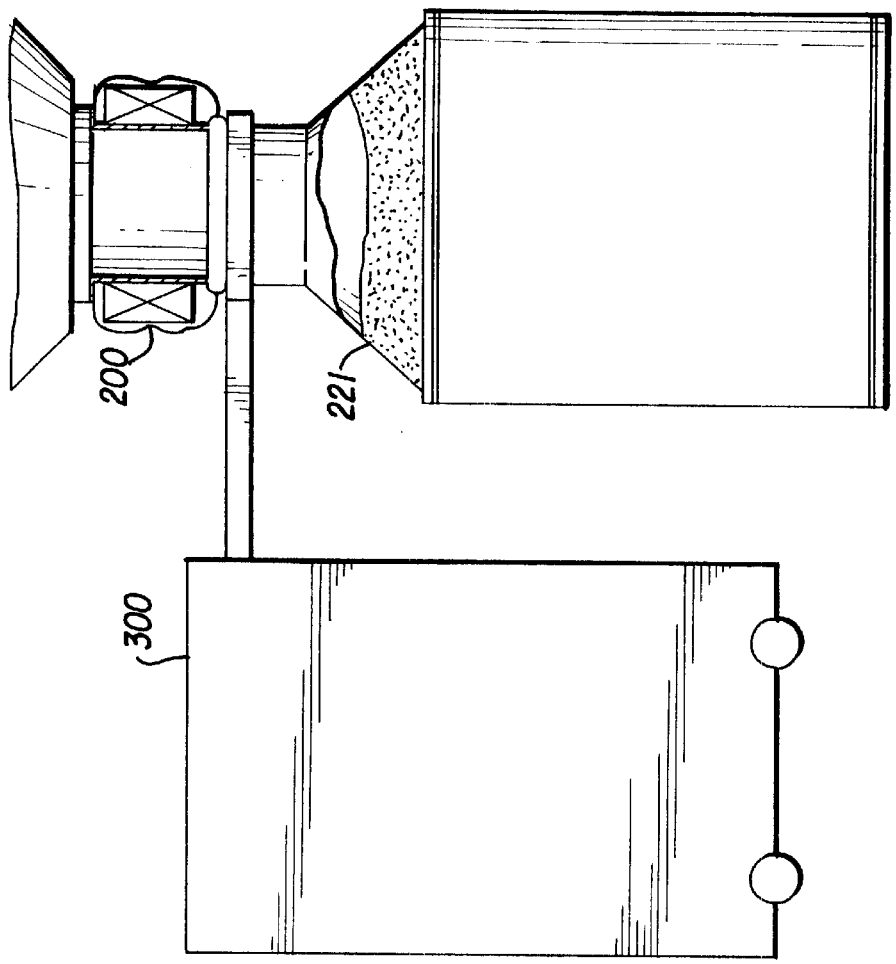
FIG. 42 is a view of the heat seal closing of the filled first transfer container.
Figure 44:
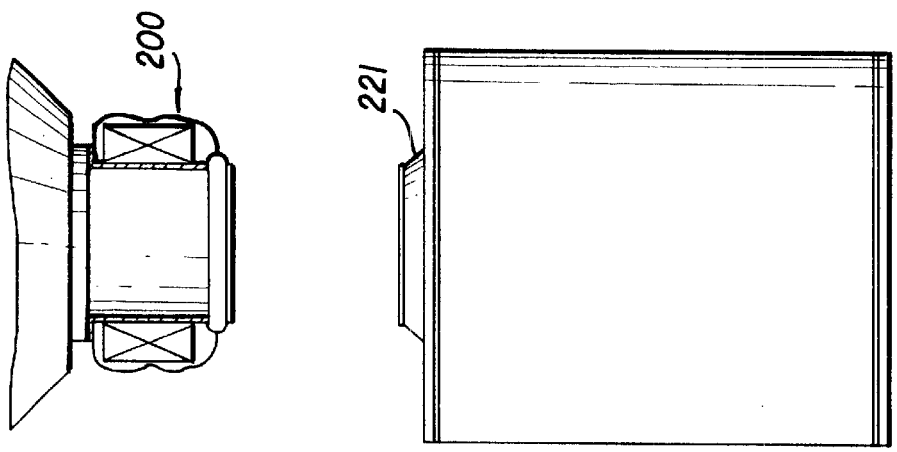
FIG. 44 is a view of the top part of the heat seal of the first transfer container as the bottom of a second transfer container.
Figure 43:
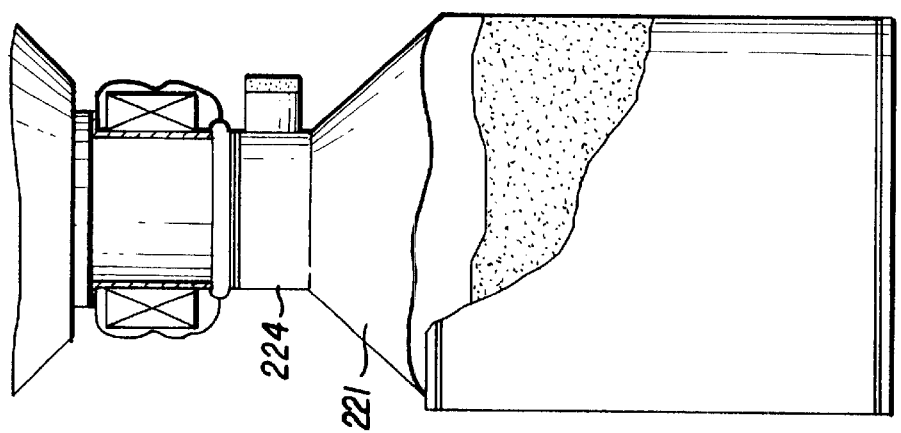
FIG. 43 is a view of detaching by cutting the filled first transfer container.

After the first transfer container 221 is filled, the top of the first transfer container charging sleeve 224 is heat sealed closed as depicted in FIGS. 42 and 43, and cut off as depicted in FIG. 44, in the middle of the heat seal. The top part of the heat seal then becomes the bottom of a second transfer container as depicted in FIG. 44, which is then ready to be pulled out of the cartridge 210 and placed into another restraint 250. The same sequence of steps is then repeated to fill and heat seal the second and successive transfer containers until the process equipment is emptied of product.

Throughout the filling process, the particulates are contained, even when changing transfer containers. A spent cartridge 210 is disconnected from the discharge flange adapter 240 and removed by using a bag-out procedure analogous to that employed with the multiple o-ring canister assembly. That is, the cartridge 210 is detached from the discharge flange adapter 240, and the cartridge connect sleeve 230 extends. Then, the cartridge connect sleeve 230 is heat sealed or wire tied and cut. The bottom of the heat seal 233 closes the top of the cartridge connect sleeve 230, and the top of the heat seal establishes the bottom of the cartridge connect sleeve film stub 234 left on the bottom of the vessel discharge flange adapter 240, thus sealing the process equipment from the environment. The replacement cartridge 210 has a cartridge connect sleeve 230 that is then attached to the discharge flange adapter 240. This encapsulates the first cartridge connect sleeve film stub 234, allowing removal of the film stub 234 from the discharge flange adapter 240 through a cartridge connect sleeve bag-out sleeve 232. The cartridge connect sleeve bag-out sleeve 232 is heat sealed or wire tied, cut, and removed. This process is repeated for all batches in a campaign.

Figure 45A:
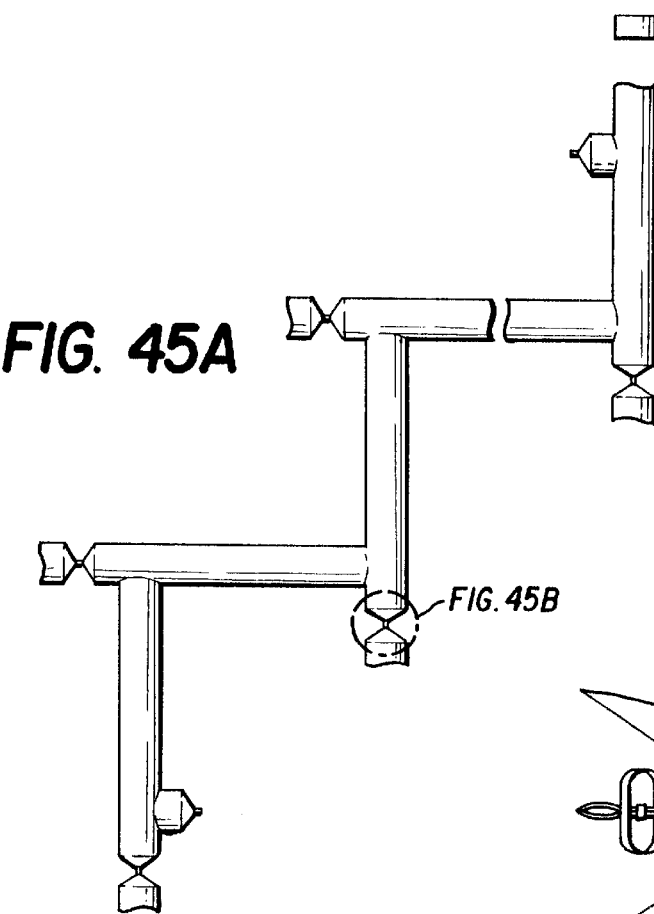
FIG. 45A is a view of an optional configuration in which the continuous sleeve comprises a series of transfer containers joined top to bottom in an alternating 90° orientation.
Figure 45B:
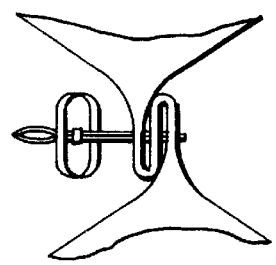
FIG. 45B is a detail view of a method of tying off a transfer container.
Figure 46:
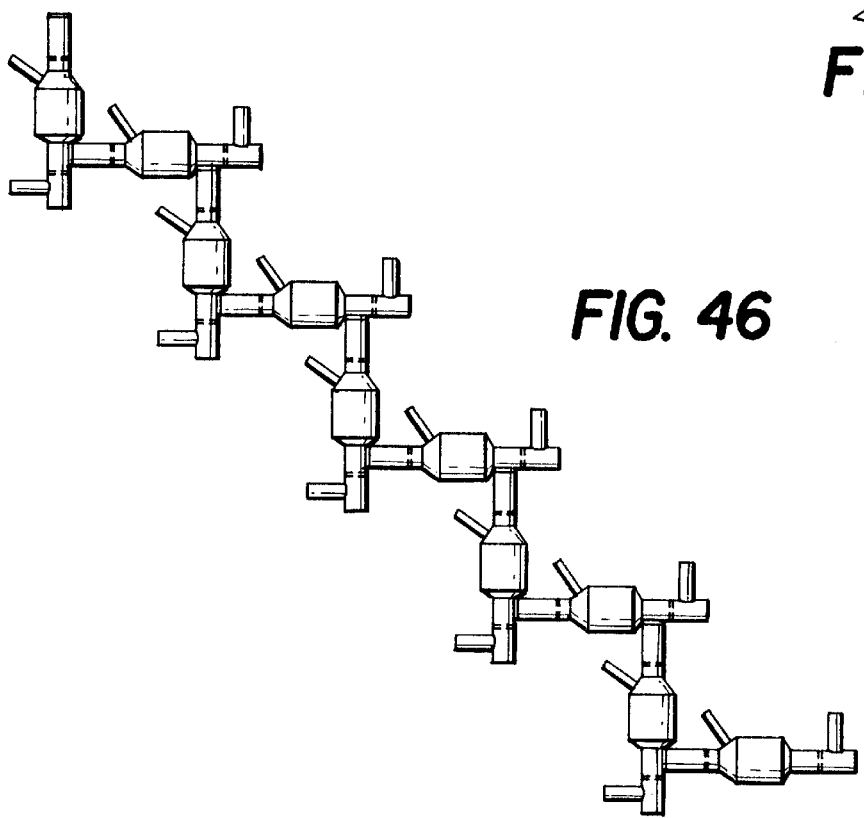
FIG. 46 is a second view of an optional configuration in which the continuous sleeve comprises a series of transfer containers joined top to bottom in an alternating 90° orientation.
Figure 47A:
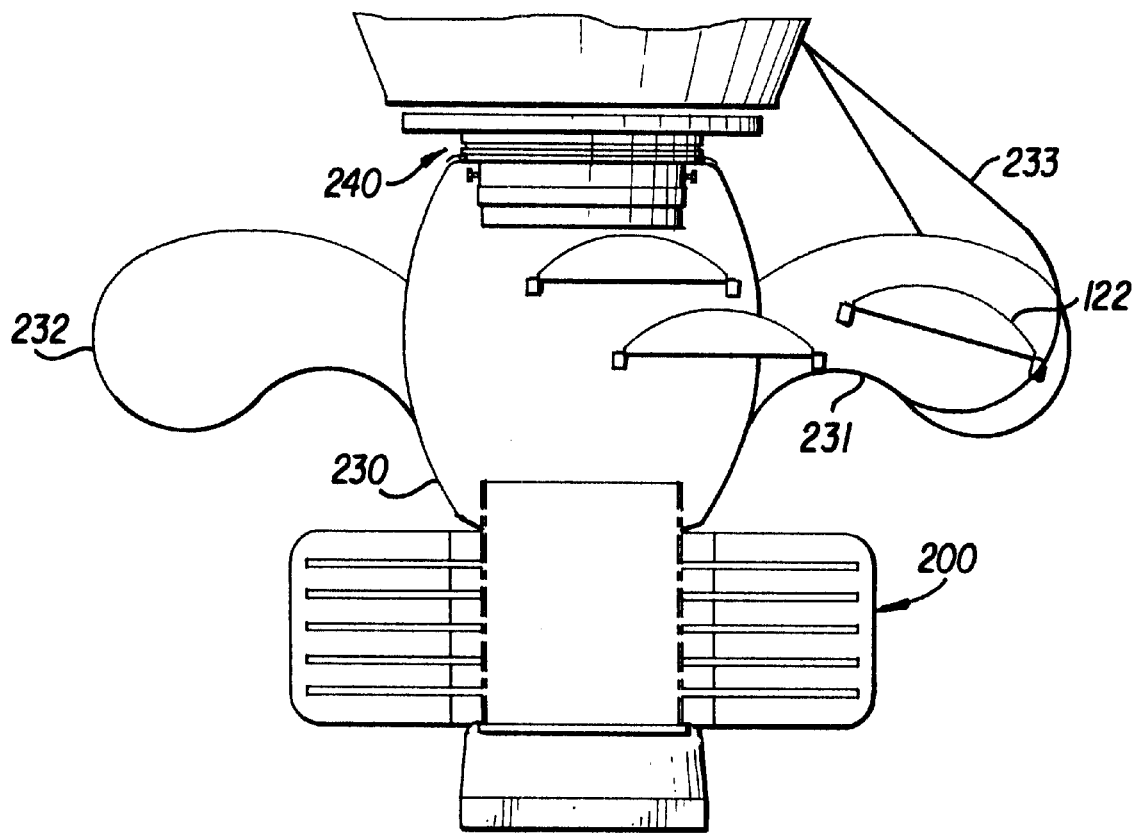
FIG. 47A is a view of the first and second in a series of manipulative steps in which the cartridge connect sleeve of a cartridge assembly is attached to the discharge flange assembly of a vessel and the vessel's vacuum plate is removed by means of the vacuum plate sleeve for a vessel discharging mode of operation.
Figure 47B:
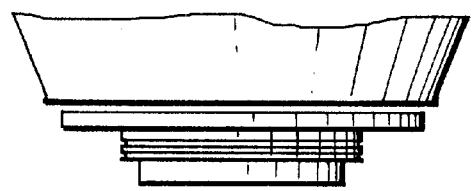
FIG. 47B is a detail view of the vessel discharge flange assembly depicted in FIG. 47A.

In an optional embodiment, depicted in FIGS. 45A and 46, a sleeve configuration can be employed in which the continuous sleeve comprises a series of transfer containers joined top to bottom in an alternating 90° orientation. FIG. 45B is a detail view of a method of tying off a transfer container.

The sequence of manipulative steps associated with a vessel discharging mode of operation is further illustrated in FIGS. 47–51. In Steps 1 and 2 depicted in FIG. 47A, the cartridge connect sleeve 230 of a cartridge assembly 200 is attached to the discharge flange adapter 240 (FIG. 47B) of a vessel. The vessel's vacuum plate 122 is then removed by means of the vacuum plate sleeve 231, and the vacuum plate sleeve 231 is supported by means of a vacuum plate sleeve support sling 233.

In Step 3 depicted in FIG. 48A, the cartridge connect sleeve 230 compresses and the cartridge 210 is attached to the discharge flange adapter 240 of the vessel. In Step 4 depicted in FIG. 48A, the first transfer container 221 is pulled down out of the cartridge 210 and placed in a suspended restraint 250. FIG. 48B is a view of the cartridge assembly before the next transfer container has been pulled down from the cartridge. FIG. 48C is a detail view of an individual transfer container.

Figure 49A:
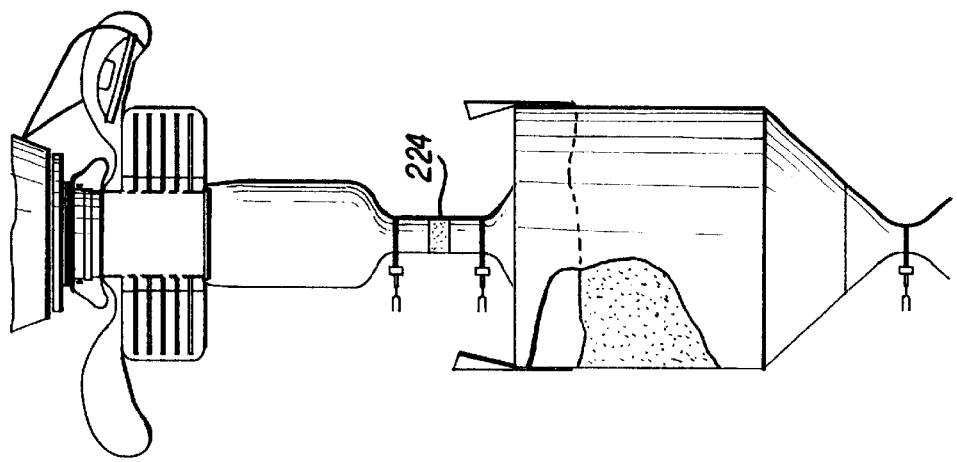
FIG. 49A is a view of the fifth step of establishing flow from the vessel to fill the first transfer container.
Figure 49B:
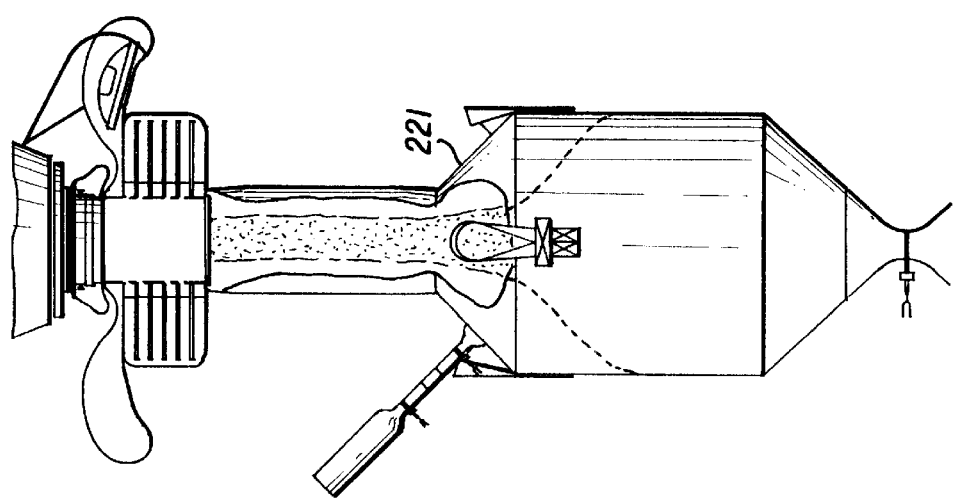
FIG. 49B is a view of the sixth step of pulling down a portion of a second transfer container from the cartridge, followed by tying and taping, or heat sealing, the neck between the top of the first transfer container and the bottom of the second transfer container.

Step 5, depicted in FIG. 49A, comprises establishing flow from the vessel to fill the first transfer container 221. Step 6, depicted in FIG. 49B, comprises pulling down a portion of a second transfer container 221 from the cartridge 210, followed by tying and taping, or heat sealing, the charging sleeve 224 between the top of the first transfer container and the bottom of the second transfer container. In Step 7 depicted in FIG. 50A, the portion of the charging sleeve 224 that has been tied and taped or heat sealed is cut and the first transfer container and its restraint are removed.

Figure 50B:
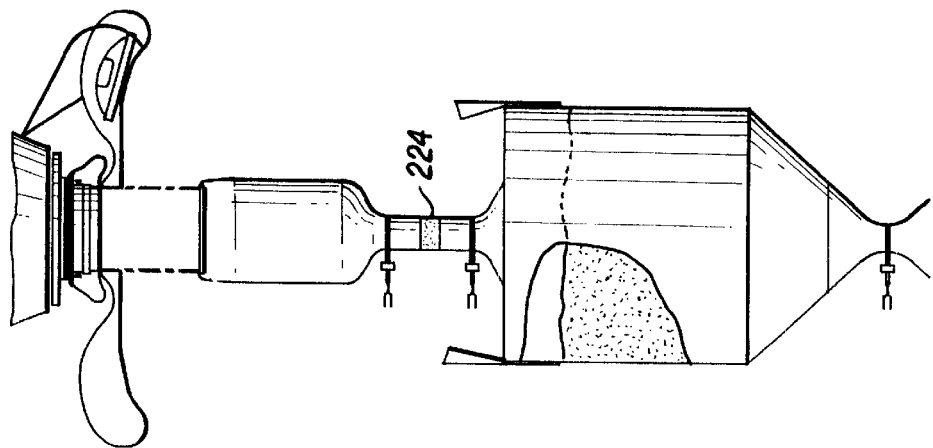
FIG. 50B is a view of the eighth step of filling the final transfer container on a cartridge.
Figure 50A:
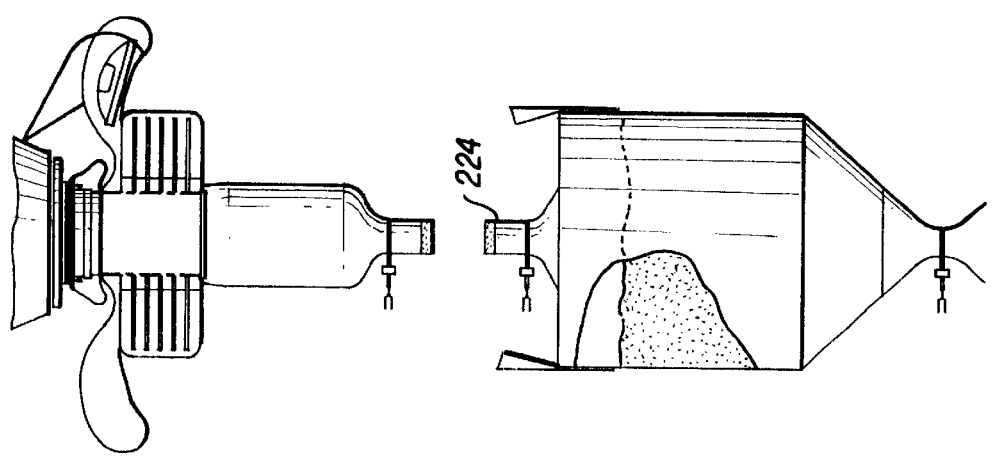
FIG. 50A is a view of the seventh step of cutting the portion of the neck that has been tied and taped or heat sealed, and removing the first transfer container and its restraint.
Figures 53A, 53B:
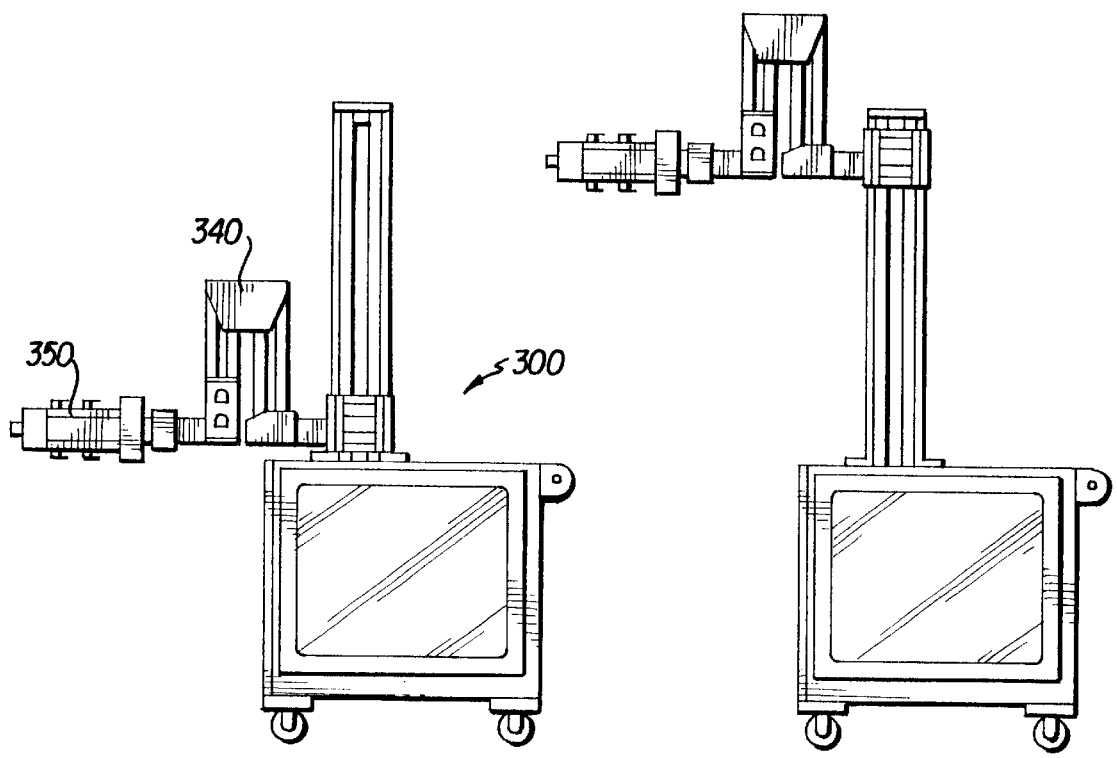
FIGS. 53A–D comprise side views of a heat seal machine which illustrate the vertical and horizontal range of motion possible with the heat seal arm in a deployed position.
Figure 53C:
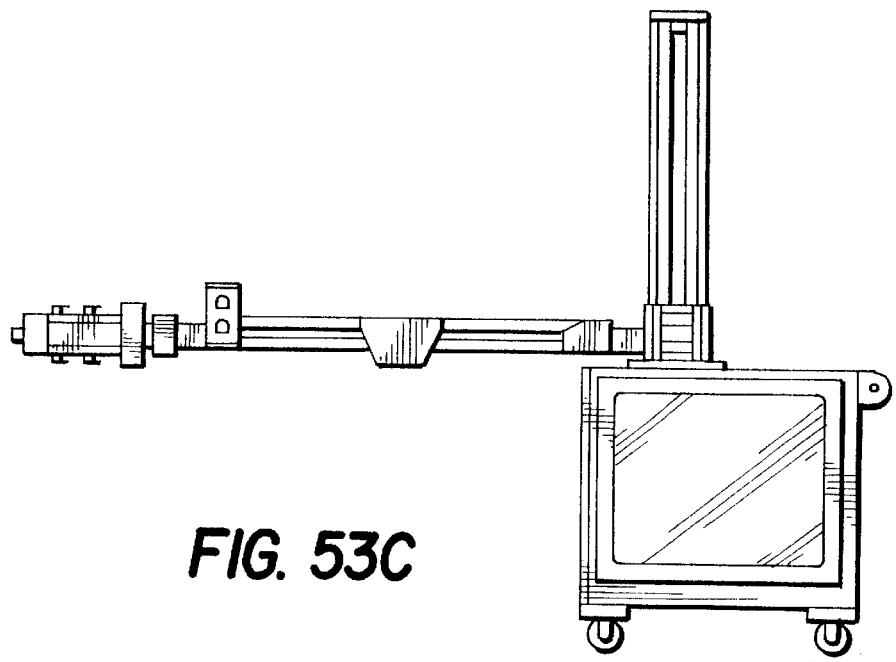
Figure 53D:
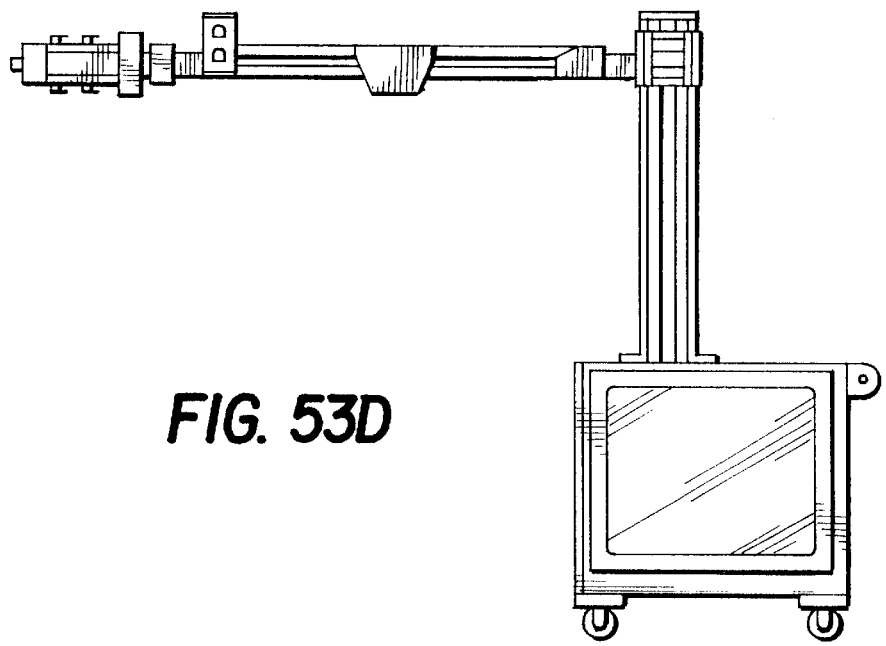

In Step 8 depicted in FIG. 50B, the final transfer container 221 on a cartridge 210 is filled, and the charging sleeve 224 portion is tied and taped or heat sealed. In Step 9 depicted in FIG. 51A, the portion of the charging sleeve 224 that has been tied and taped or heat sealed is cut and the final transfer container on a cartridge and its restraint are removed.

In Step 10 depicted in FIG. 51B, the spent cartridge 210 is detached from the discharge flange adapter 240 of the vessel and the cartridge connect sleeve 230 extends. The vacuum plate 122 is reinserted, and the spent cartridge 210 is removed by using a bag-out procedure.

Thus, the invention comprises: i) multiple transfer containers fabricated in a sleeve-like continuous manner by joining the top of one transfer container to the bottom of the next; ii) a cartridge with a circular cross section that allows the transfer containers to be mounted on the outside of the cartridge and product to flow through the inside to fill each transfer container; iii) a heat sealed closure between transfer containers that is cut in the middle such that the heat sealed top of a first transfer container and the heat sealed bottom of a second transfer container is formed from each heat sealing operation; and iv) an integral sampling port in each transfer container. In an optional embodiment, a tape or a draw cord closure is employed instead of heat sealing. In another optional embodiment, adjacent transfer containers are oriented in an alternating 90° configuration.

Referring to FIGS. 52A–D and 53A–D, a heat seal machine 300 of the present invention is shown. FIGS. 52A, B, C, and D comprise left side, front side, right side, and top views of the heat seal machine 300 with the heat seal flexarm 340 in a stowed position. FIGS. 53A–D comprise left side views of a heat seal machine 300 which illustrate the vertical and horizontal range of motion possible with the heat seal flexarm 340 in a deployed position.

As depicted in FIG. 52A, the heat seal machine 300 comprises five main components: the control enclosure cabinet 310; the user control box 320; the tower 330; the flexarm 340; and the heat seal head 350.

In a first embodiment, the main control enclosure 310 houses both the power and temperature controls, and the logic circuits to perform the basic functions of heat sealing utilizing a resistive heating element. It also houses two purge and pressurization systems to remove the presence of, and prevent the ingress of, flammable gases and combustible dusts, when power is applied to the system.

The first purge and pressurization system is for the main control enclosure 310, and is a type "X" system for Class I, Division 1, Groups C and D and Class II, Division 1, Group G materials. It is an automatic system will purge any hazardous materials which may have invaded the enclosure, and then pressurize the enclosure so as to prevent further ingress of those materials.

The second purge and pressurization system is for the heat sealing head 350 itself and is also a type "X" variety for Class I, Division 1, Groups C and D and Class II, Division 1, Group G materials. The second purge and pressurization system is designed to automatically purge and pressurize a small enclosure created by the heat sealing head structure. This system prevents power from being applied or heat from being generated until the purging and pressurizing actions have been completed.

Pneumatic and electrical mating between the heat sealing head 350 and the control panel comprises sealed connections. The heat sealing head 350 comprises several hinged bars that clamp together manually by the operator. The closure is sensed and automatically latched by the main control enclosure system to prevent accidental premature opening and exposure of the heating element to the surrounding hazardous atmosphere.

The heat sealing head 350 contains two temperature sensors, one on each side of the material being sealed. Operator controls are mounted on the heat sealing head 350 to allow the operator to operate clamping mechanisms on the head 350 and thus begin the heat sealing process. The invention also comprises control lights to indicate the status of the seal in process or to warn of system faults or problems.

The invention provides for the utilization of the purge and pressurization system with a purgeable enclosure formed by the components of the heat sealing head 350. Applying high current and voltage to a resistive heating element is not usually permitted in classified (hazardous) locations both because of the wiring involved (spark potential) and the high temperatures that are required to perform the sealing. The wiring can be accommodated, however, because the entire head assembly is purged and pressurized prior to each heat seal cycle, thereby removing any dangerous contaminants and preventing further ingress.

In addition, the heat sealing head 350 is sufficiently insulated from the surrounding atmosphere so as to prevent any exposed surface from being subjected to an increase in temperature and thereby potentially igniting that atmosphere. The system comprise a unique temperature monitoring system not only to ensure proper sealing, but also to verify that the internal temperatures of the sealing head enclosure have cooled to below the autoignition temperature of any solvents that may be in the area. Once this cooling process has been completed, the heat sealing head 350 can be safely opened to remove the sealed transfer container material.

The dual temperature sensing comprises a system that controls the heater element temperature and monitors the material temperature. The material temperature sensor terminates the heat cycle at a particular temperature. The technique of the present invention differs substantially from conventional technology in which a dwell timer is used to set a particular time, or input heater temperature side monitoring, at which the heat seal cycle will end. The conventional process relies on a pre-determined dwell time setting, or heater temperature, that is to be found by experimentation. This time or heater temperature is then fixed and used throughout the process.

The present process is capable of detecting the temperature of the bottom side of the material opposite the heater. By knowing both the temperature of the heater side and the temperature of the bottom side of the material, and realizing that the temperature gradient through the material cross-section is linear, it can be assured that the material interface being sealed is within a known temperature range. The present system will always allow the material to reach this level no matter how long or how short the time is. A setpoint for each of the top and bottom temperature sensors ensures that the heater will not exceed the scorching limit of the material on top, and that the end of the process will be signaled when the setpoint is reached on the bottom. The top and bottom temperature sensors also aid in signaling when the material is cool enough to open the jaws of the heat sealing head 350.

A conventional, timed or heater temperature monitored system inherently cannot account for variations in material thickness, machine temperature, or aging heaters. Advantageously, however, by having complete feedback control, any such guesswork associated with the setup is eliminated through use of the present invention.

In a second embodiment of the heat seal machine, the main control enclosure 310 houses a single purge and pressurization system to remove the presence of, and prevent the ingress of, flammable gases and combustible dusts, when power is applied to the system.

In the second embodiment of the heat seal machine, the purge and pressurization system is for the heat seal head enclosure and the main control enclosure 310, and is a type "X" system for Class I, Division 1, Groups C and D and Class II, Division 1, Group G materials. It is an automatic system will purge any hazardous materials which may have invaded the enclosures, and then pressurize the enclosures so as to prevent further ingress of those materials.

The second embodiment of the heat seal machine therefore also provides for the utilization of the purge and pressurization system with a purgeable enclosure formed by the components of the heat sealing head 350. As described above in conjunction with the first embodiment of the heat seal machine, applying high current and voltage to a resistive heating element is not usually permitted in classified (hazardous) locations both because of the wiring involved (spark potential) and the high temperatures that are required to perform the sealing. The wiring can be accommodated in the second embodiment of the heat seal machine, however, because the entire heated head is encapsulated by an enclosure that is purged and pressurized so as to prevent any ingress of dangerous contaminants.

Thus, the invention comprises: i) a heat seal system that is capable of operating safely in a hazardous environment, and ii) a heat seal duration (confirmation of sealing) that is controlled by the use of temperature sensors on the material.

Figure 57:
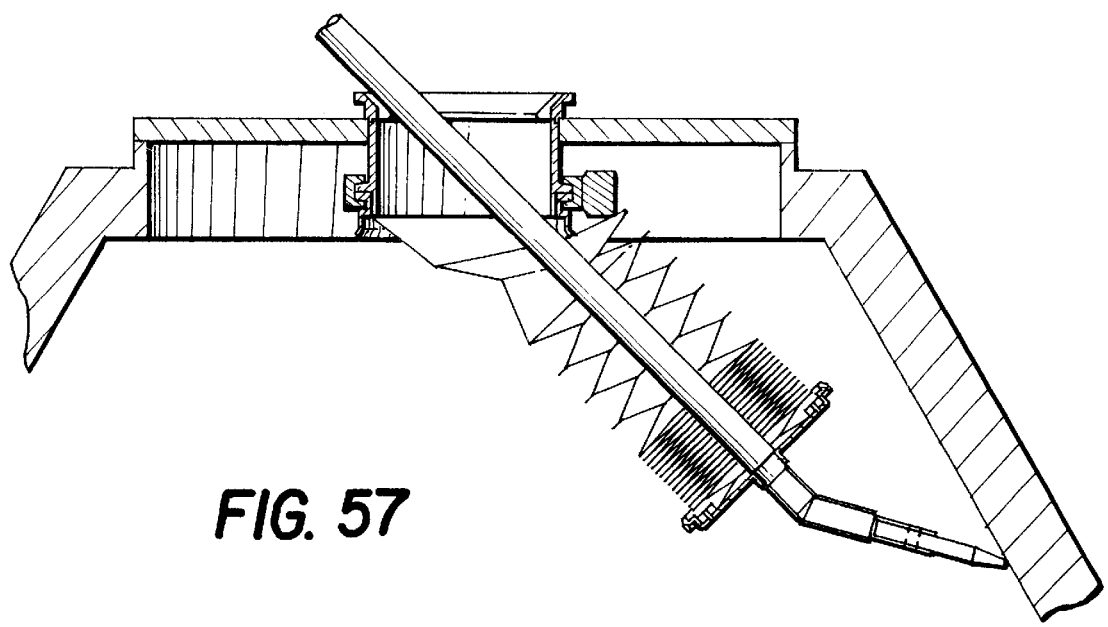
FIG. 57 is a view of the rodding assembly access layout comprising a bellows rod assembly.
Figure 55:
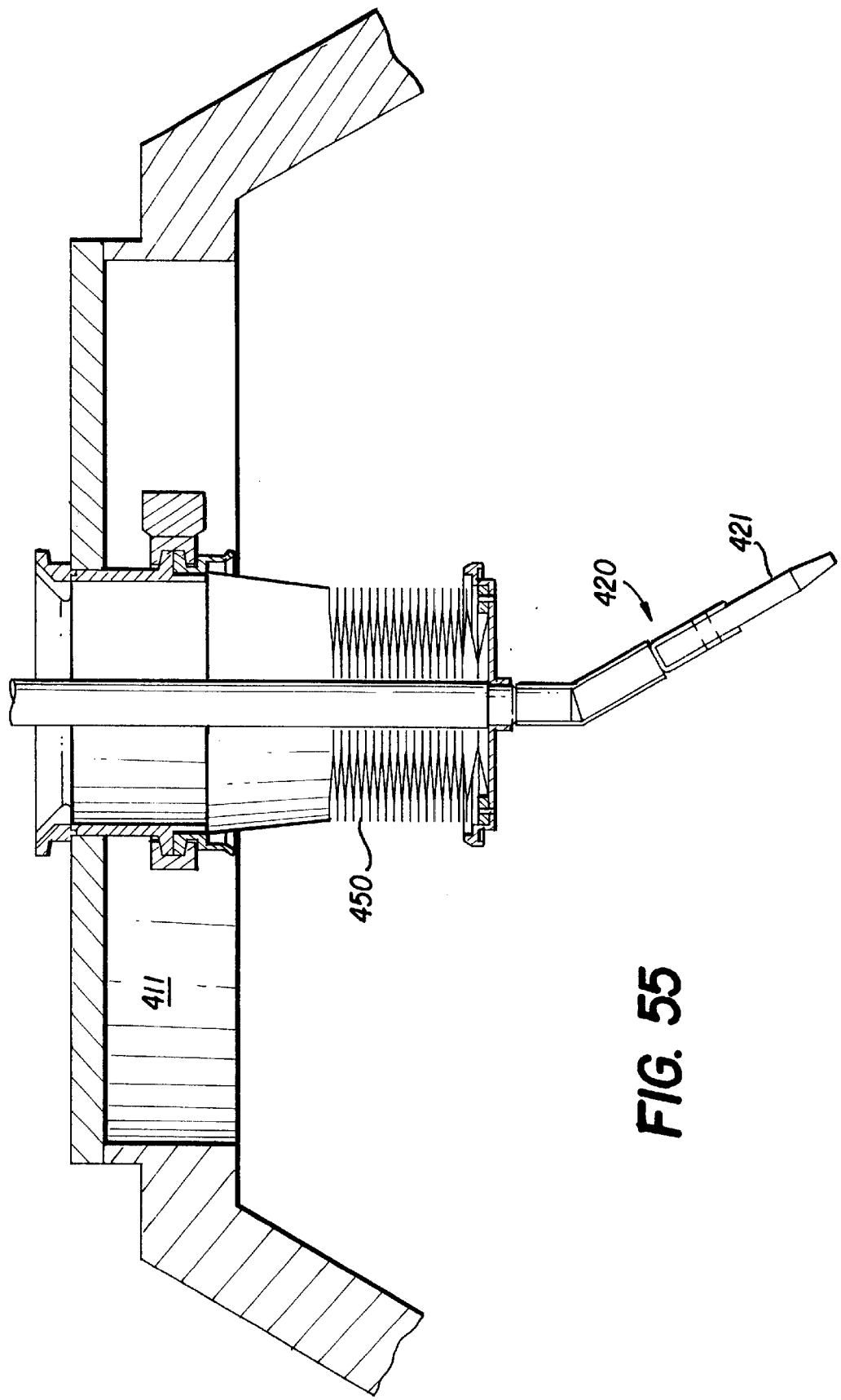
FIG. 55 is a view of the rodding assembly in a partially deployed position.

Referring to FIG. 54, a rodding apparatus 400 of the present invention is shown. The rodding apparatus 400 comprises a closure plate 410 installed in the top charging port 411 of a piece of processing equipment which for the purpose of illustration is depicted as a rotary vacuum dryer. A post 412 having a means for attaching a first section of a rodding pole 440, such as a threaded portion 413, penetrates the closure plate 410 and connects inside the equipment to a top portion of blade assembly 420. The blade assembly 420 is attached to the underside of the closure plate 410 at the upper inside surface of the equipment as depicted in FIG. 55. The blade assembly 420 comprises a blade 421 and a connecting portion 422 for engaging the post 412. A bellows assembly 450 totally encapsulates the rod assembly 400 so that there is a barrier between the inside and outside of the equipment as depicted in FIG. 57.

Figure 56:
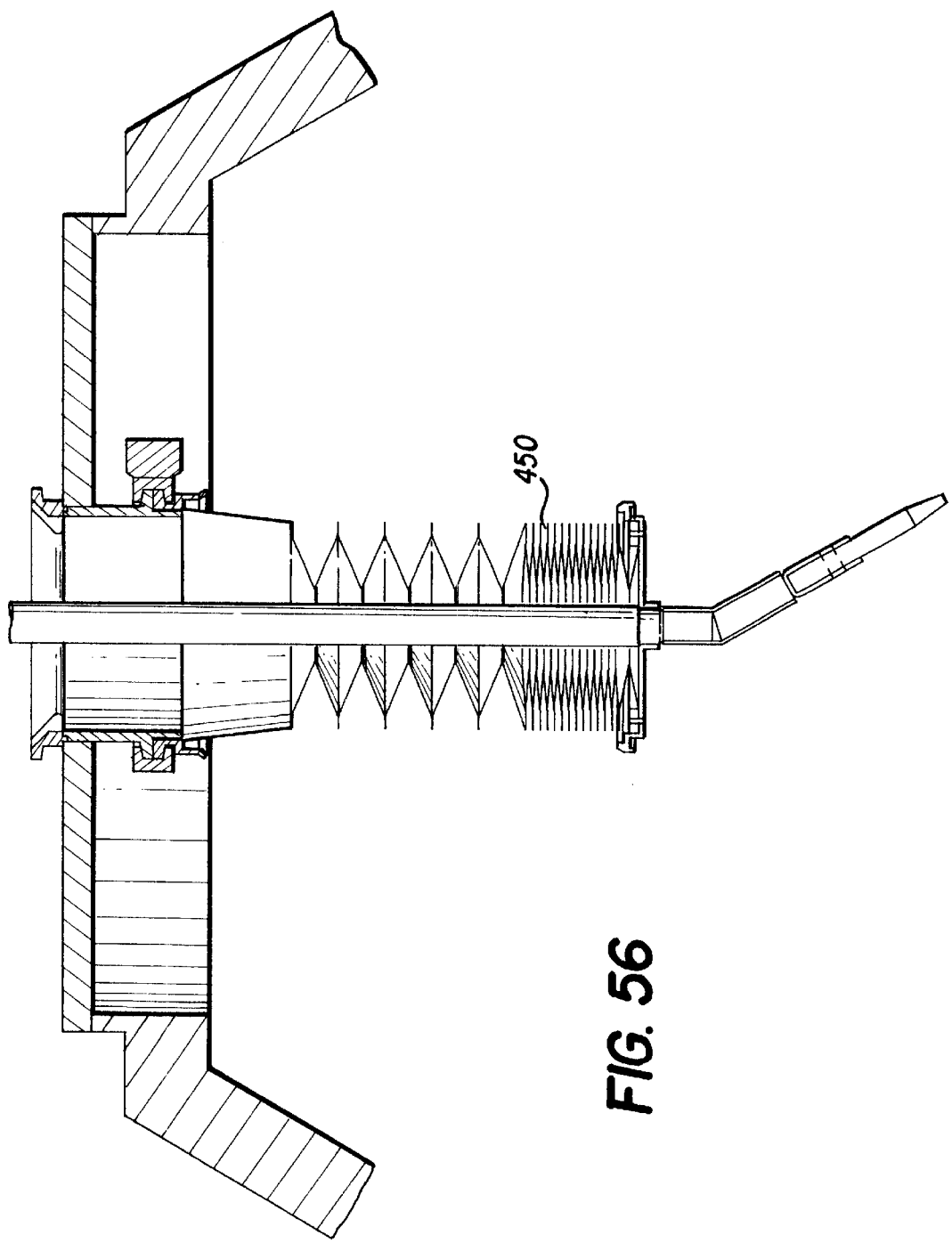
FIG. 56 is a view of the rodding assembly released from stowage.

A first section of a rodding pole 440, to which additional sections can be attached, is releasably attached to the post 412. A means for securing 430 the bellows assembly 450 and the blade assembly 420 in a stowed position, such as a tri-clover clamp, is operated from the exterior of the equipment. Thus, the blade assembly 420 can be deployed in a completely contained manner. Once the means for securing 430 is released, the blade assembly 420, post 412, and rodding pole 440 can begin to descend into the equipment as depicted in FIG. 55. The attachment of subsequent rodding pole sections to the top of a previously attached section, and the expansion of the bellows assembly 450 as depicted in FIGS. 56 and 57, facilitates fully extending the blade assembly 420 into the equipment.

Figure 58:
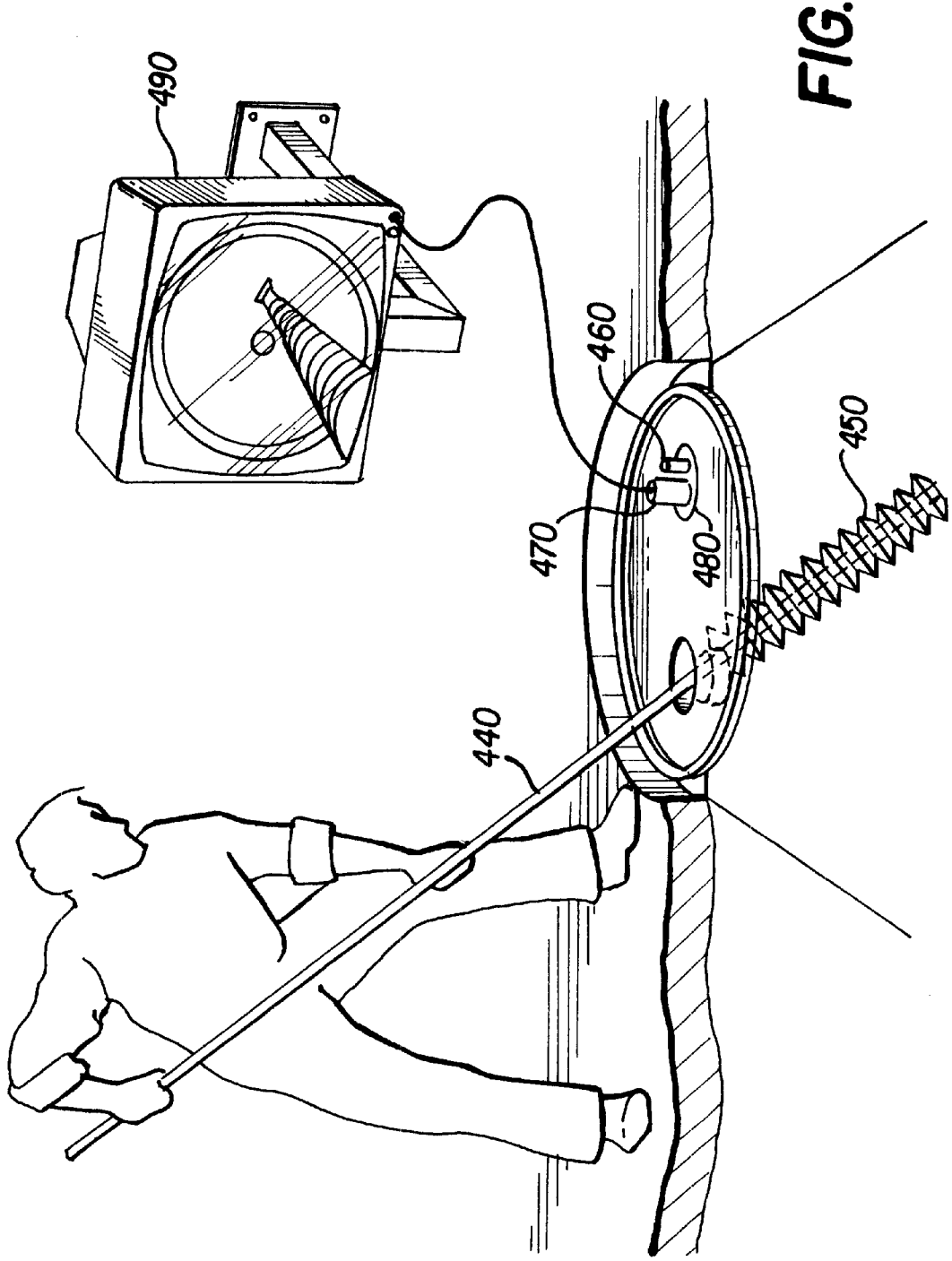
FIG. 58 is a view of the rodding assembly in operative cooperation with a light source, a video camera, and a video monitor.

A light source 460 illuminates the inside of the equipment and a wide angle video camera 470 monitors the activity inside the equipment through a transparent glass view port 480 depicted in FIG. 58. FIGS. 59A–C are views of a vessel port assembly 481 which facilitates the insertion of a fiber optic light source and a borescope video camera. An operator moves the rodding pole 440 up and down in combination with an off-vertical axis motion to scrape the inside surface of the equipment, thereby pushing the particulate material down through the discharge port. The activity inside the equipment is monitored by an operator using an external video monitor 490 that is connected to the video camera 470 depicted in FIG. 58. When the entire contents of the equipment have been dispensed, the rodding pole 440 is retracted from the equipment, the rodding pole sections are removed, and the blade assembly 420 is secured to the top of the closure plate 410.

The rodding process can be repeated for subsequent lots of the same material without removal of the closure plate assembly. The closure plate 410 is removed and cleaned between dissimilar lots of particulates. The bellows assembly 450 is replaced during the cleaning operation.

Thus, the invention comprises: i) a blade assembly attached to the closure plate encapsulated by the flexible bellows assembly; ii) use of an externally positioned video camera, light source, and video monitor to monitor the activity inside the equipment without breach of containment; and iii) use of an integral closure plate, video monitoring system, and rodding system to facilitate rodding in a contained manner.

The transfer containers of the present invention, which were developed to meet the stringent standards required for use in Europe, are fabricated from a flexible material that comprises an olefinic base resin film which is electrostatic dissipative. The material comprises in greatest proportion the olefinic base resin, in a lesser proportion an antistatic agent, and in a least proportion a filler with a resin.

The film possesses a thickness ranging from 4 to 6 mil; a surface resistivity (as determined by ASTM D-257-79) of less than $1\times10^{11}$ ohms per square; and a charge decay (as determined by British Standard BS7506) of less than 3.5 seconds.

The film satisfies a discharge incendivity test which determines whether the material in use as a fabric intermediate bulk container can produce an electrical discharge from its surface which could cause an ignition of flammable materials. This assessment is made by continuously delivering charge into an empty bag and attempting to ignite a mixture of ethylene and air with discharges from the bag surface. The test uses a gas shroud probe in which the gas mixture ignition energy ranges from 0.096 to 0.18 mJ. The charge on the bag is created by dispensing foam pellets into the bag or by the use of a corona charging probe that is hung on the inside of the bag and energized by up to 50,000 volts. The test is repeated 80 or more times. If the flammable gases are ignited at any time during the testing, the material fails. The tests are conducted in both ambient and low, i.e., less than 15% relative humidities, as static charges tend to accumulate more in lower humidities.

Thus, in a first embodiment, the film comprises an olefinic base resin, antistatic additives, and inorganic fillers. The base resin comprises materials such as polyethylene, polypropylene, or mixtures thereof. Antistatic additives and inorganic fillers are then incorporated into the base resin for improved processibility and performance. The resin is present in a range of from 95.0 to 99.5%; the antistatic additives are present in a range of from 0.1 to 0.6%; and the inorganic filler is present in a range of from 0.1 to 1.0%.

In a more preferred embodiment, the film comprises olefinic resins such as linear low density polyethylene ("LLDPE"), ultra low density polyethylene ("ULDPE"), or mixtures thereof; amine-based or amide-based antistatic additives, or combinations thereof; and a silica-based inorganic filler. The antistatic additives impart excellent static dissipative properties to the formulation and offer improved shelf life. The silica-based inorganic filler imparts excellent slip and antiblock properties in the finished film product. In this more preferred embodiment, the resin is present in a range of from 98 to 99.5%; the amide antistatic agent is present in a range of from 0.1 to 0.5%; the amine antistatic agent is present in a range of from 0.01 to 0.1%; and the silica-based inorganic filler, such as diatomaceous earth, is present in a range of from 0.1 to 1.0%.

In a most preferred embodiment, the film comprises an ethylenic base resin such as LLDPE or ULDPE, wherein a most preferred ethylenic base resin is a metallocene-catalyzed resin such as a copolymer of ethylene and 1-octene; an antistatic additive comprising either amide-based or amine-based antistatic materials, wherein a most preferred antistatic additive is a combination of N,N-bis(2-hydroxyethyl)dodecaneamide and POE(2) C13–C15 alkylamine (where "POE" represents polyoxyethylene); and a silica-based antiblock and slip additive, wherein a most preferred antiblock and slip additive is a flux calcined diatomaceous earth grade. In this most preferred embodiment, the metallocene resin is present in a range of from 99.0 to 99.4%; the N,N-bis(2-hydroxyethyl) dodecaneamide is present in a range of from 0.3 to 0.5%; the POE(2) C13–C15 alkylamine is present in a range of from 0.05 to 0.1%; and the flux calcined diatomaceous earth is present in a range of from 0.1 to 0.4%.

While the resin has been disclosed as constituting in its broadest range from 95.0 to 99.5% of the film, it should be appreciated that this percentage represents the total amount of resin present in the film, and represents the sum of the individual percentages of resin contained in the base resin, the antistatic additives, and the inorganic fillers. The resin may be introduced directly, or as part of a masterbatch with each of the other components of the film.

The metallocene-type polyethylene provides a film material having excellent crack resistance and twice the strength and durability afforded by other types of polyethylenes, such as, for example, standard linear low density polyethylene. The antistatic agent results in very low electrostatic charge dissipation times, which is essential to the prevention of incendiary discharges as the transfer container is filled with powder in hazardous locations. The film material is thermoplastic, which allows it to be thermally welded to itself without the need for either chemical primers or adhesives.

Additionally, the film material is virtually clear, which affords operators the ability to view the contents of a container. Finally, the film can easily be fabricated in various configurations to meet the needs of a specific application.

Thus, the present invention provides an economical and reliable system for the contained transfer of particulates. The system provides an environment in which the full-body protective suits and respirators associated with conventional transfer methods are unnecessary during discharging and charging operations. From a containment standpoint, the invention provides for improved economics resulting from the enhanced recovery of particulates. By providing for continuous containment even when it is necessary to mount subsequent transfer containers, the invention overcomes the prior art problem associated with the presence of particulate on both the tube and the vessel port, and solves the mechanics of discharging the contents of a filled transfer container into a vessel in a subsequent processing step.

The improved containment contributes to the possibility of employing heat sealing in an environment which heretofore has contained an unacceptable level of combustible dusts. The rodding apparatus facilitates the contained mechanical breakup of agglomerated particulates while eliminating the risk to operators, and finally, the disposable transfer container itself possesses the necessary combination of properties for use in the present system.

While only certain preferred embodiments of this invention have been shown and described by way of illustration, many modifications will occur to those skilled in the art. Additionally, while the invention has been described in terms of its application to the pharmaceutical industry, the system is equally applicable to any industrial application which requires the contained transfer of particulates. It is, therefore, desired that it be understood that it is intended herein to cover all such modifications that fall within the true spirit and scope of this invention.

What is claimed is:

1. A transfer apparatus comprising a bag, said bag comprising a film having a thickness of 4 to 6 mils, said film comprising:

a metallocene catalyzed olefinic base resin in an amount of 99.4–99.5% by weight of said film;

an amide-based antistatic agent in a range of from 0.1 to 0.5% by weight of said film; and an amine-based antistatic agent in a range of from 0.01 to 0.1% by weight of said film; and the balance of said film being a filler comprising diatomaceous earth;

wherein said amide-based antistatic agent comprises N,N-bis(2-hydroxyethyl)dodecaneadmide and said amine-based antistatic agent comprises POE(2) C13–C15 alkylamine and said film has a surface resistivity of less than $1\times10^{11}$ ohms per square and a charge decay of less than 3.5 seconds.

2. A transfer apparatus according to claim 1, wherein the proportions of said olefinic base resin, amide-based antistatic agent, amine-based antistatic agent and filler are selected such that said film passes a discharge incendivity test.

3. An apparatus for transporting pharmaceuticals without exposing workers to the health hazards of the pharmaceuticals, said apparatus comprising a bag, said bag comprising a film, said film comprising:
a metallocene-catalyzed olefinic base resin in an amount of 99.4–99.5% by weight of said film;
an amide based-antistatic agent in a range of from 0.1 to 0.5% by weight of said film; and
an amine-based antistatic agent in a range of from 0.01 to 0.1% by weight of said film; and
the balance of said film being a filler comprising diatomaceous earth;
wherein the amide-based antistatic agent comprises N,N-bis(2-hydroxyethyl)dodecaneadmide; and the amine-based antistatic agent comprises POE(2) C13–15 alkylamine and said film has a surface resistivity of less than $1\times10^{11}$ ohms per square and a charge decay of less than 3.5 seconds; and a pharmaceutical, disposed within the bag.

4. An apparatus according to claim 3, wherein said olefinic base resin is a metallocene catalyzed resin; and the filler is diatomaceous earth.

5. The apparatus of claim 3, wherein the bag is heat sealed with the pharmaceutical inside.

* * * * *